US011271795B2

(12) United States Patent
Bhalla et al.

(10) Patent No.: US 11,271,795 B2
(45) Date of Patent: Mar. 8, 2022

(54) SYSTEMS AND METHODS FOR PROACTIVE NETWORK OPERATIONS

(71) Applicant: Ciena Corporation, Hanover, MD (US)

(72) Inventors: Shelley A. Bhalla, Morrisville, NC (US); Magdi Wissa, Ottawa (CA); Thomas Triplet, Manotick (CA); David Côté, Gatineau (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/534,134

(22) Filed: Aug. 7, 2019

(65) Prior Publication Data

US 2020/0259700 A1 Aug. 13, 2020

Related U.S. Application Data

(63) Continuation-in-part of application No. 16/270,667, filed on Feb. 8, 2019.

(51) Int. Cl.
| | |
|---|---|
| *H04L 12/24* | (2006.01) |
| *H04L 41/0631* | (2022.01) |
| *G06N 20/00* | (2019.01) |
| *G06F 3/0482* | (2013.01) |
| *H04L 41/147* | (2022.01) |
| *H04L 41/22* | (2022.01) |
| *H04L 41/5074* | (2022.01) |
| *H04L 67/12* | (2022.01) |

(52) U.S. Cl.
CPC ........ *H04L 41/0631* (2013.01); *G06F 3/0482* (2013.01); *G06N 20/00* (2019.01); *H04L 41/147* (2013.01); *H04L 41/22* (2013.01); *H04L 41/5074* (2013.01); *H04L 67/12* (2013.01)

(58) Field of Classification Search
CPC ... H04L 41/0631; H04L 41/147; H04L 41/22; H04L 41/5074; H04L 43/045; H04L 41/064; H04L 41/16; G06N 20/00; G06F 3/0482
See application file for complete search history.

(56) References Cited

U.S. PATENT DOCUMENTS 6,175,868 B1 1/2001 Lavian et al.
6,546,500 B1 * 4/2003 Miyamoto .......... G06F 11/1451
714/5.1

(Continued)

OTHER PUBLICATIONS

May 5, 2020, International Search Report and Written Opinion for International Patent Application No. PCT/US2020/016939.

*Primary Examiner* — Eric J Yoon
(74) *Attorney, Agent, or Firm* — Clements Bernard Baratta; Lawrence A. Baratta, Jr.; Christopher L. Bernard

(57) ABSTRACT

Systems and methods include obtaining telemetry data associated with a network having a plurality of network elements; presenting a list of ongoing issues and predicted issues based on the telemetry data, on a display; responsive to a selection of an issue that is one of the ongoing issues and the predicted issues in the list, presenting a root cause analysis of the issue including one or more diagnosis; presenting a list of prescriptive actions on the display to address the issue based on the root cause analysis including a mechanism for a user to cause execution of any of the prescriptive actions; and receiving a selection of one or more of the prescriptive actions from the user.

17 Claims, 23 Drawing Sheets

(56) References Cited

U.S. PATENT DOCUMENTS

| | | | |
|---|---|---|---|
| 7,006,866 B1* | 2/2006 | Deco | G05B 23/024 |
| | | | 607/5 |
| 8,306,938 B1 | 11/2012 | Howard et al. | |
| 8,456,984 B2 | 6/2013 | Ranganathan et al. | |
| 8,531,969 B2 | 9/2013 | Ong | |
| 8,606,105 B2 | 12/2013 | Ong | |
| 9,071,532 B2 | 6/2015 | Oltman et al. | |
| 9,774,502 B2 | 9/2017 | Ong | |
| 9,838,271 B2 | 12/2017 | Djukic et al. | |
| 10,015,115 B2 | 7/2018 | Ranganathan et al. | |
| 10,027,530 B2* | 7/2018 | Mahkonen | G06F 16/22 |
| 10,187,318 B2 | 1/2019 | Cote et al. | |
| 10,282,669 B1* | 5/2019 | Chen | G06N 5/02 |
| 10,938,634 B1* | 3/2021 | Cruise | H04L 41/0686 |
| 2005/0152284 A1 | 7/2005 | Kotha et al. | |
| 2008/0140817 A1* | 6/2008 | Agarwal | H04L 67/125 |
| | | | 709/223 |
| 2011/0055138 A1* | 3/2011 | Khanduja | H04L 41/0631 |
| | | | 706/47 |
| 2011/0175750 A1* | 7/2011 | Anderson | G01D 4/004 |
| | | | 340/870.16 |
| 2016/0212266 A1* | 7/2016 | Soundar | H04M 3/51 |
| 2017/0206592 A1* | 7/2017 | Chen | G06Q 30/0635 |
| 2017/0251006 A1* | 8/2017 | LaRosa | H04L 63/1441 |
| 2017/0270432 A1 | 9/2017 | Sachdev et al. | |
| 2017/0364819 A1* | 12/2017 | Yang | H04L 41/0636 |
| 2018/0152358 A1* | 5/2018 | Chheda | H04L 41/5009 |
| 2018/0191552 A1* | 7/2018 | Kushnir | H04L 41/142 |
| 2018/0248905 A1 | 8/2018 | Côté et al. | |
| 2019/0123981 A1* | 4/2019 | Johanson | G06Q 30/06 |
| 2019/0324831 A1* | 10/2019 | Gu | G06F 11/0793 |
| 2019/0361759 A1* | 11/2019 | Haugen | G06F 11/079 |

* cited by examiner

SYSTEMS AND METHODS FOR PROACTIVE NETWORK OPERATIONS

CROSS-REFERENCE TO RELATED APPLICATION(S)

The present disclosure is a continuation-in-part of U.S. patent application Ser. No. 16/270,667, filed Feb. 8, 2019, and entitled "Safeguarding Artificial Intelligence-based network control," the contents of which are incorporated by reference herein.

FIELD OF THE DISCLOSURE

The present disclosure generally relates to networking systems and methods. More particularly, the present disclosure relates to systems and methods for proactive network operations.

BACKGROUND OF THE DISCLOSURE

During operation, it is critical to troubleshoot and resolve network operations as quickly as possible to ensure service reliability. There are existing approaches for network troubleshooting that were developed for physical networks with static services, and that revolves around reactive processes based on events and alarms. As the network becomes increasingly complex and more dynamic, such conventional approaches are simply not effective or scalable. Because network operators generally lack visibility and insight into which of the multitude of alarms are truly critical, they are faced with the various challenges. First, problems are detected reactively, after the damage has already spread across a significant part of the network. Second, there is an indefinite length of time until services can be fully restored due to lengthy processes related to determining the root-cause of issues. Third, there is a waste of time and resources resulting from the maintenance of spare inventory, often not aligned with true requirements as well as emergency truck rolls. The overall problem is exacerbated by the fact that different troubleshooting skillsets and processes need to be applied across different technologies, different vendor equipment, etc.

There is a need automate and optimize network operations utilizing Artificial Intelligence (AI)/Machine Learning (ML) capabilities to determine probable root cause along with a user interface enabling efficient operations.

Further, networks are controlled via various approaches including control planes, Software Defined Networking (SDN) controllers, Network Management Systems (NMS), and the like. As described herein, networks can include Layer 0 (photonic such as Dense Wavelength Division Multiplexed (DWDM), Layer 1 (Time Division Multiplexed (TDM) such as Optical Transport Network), Layer 2 (Packet, Multiprotocol Label Switching (MPLS), Layer 3 (Internet Protocol (IP)), and the like including combinations thereof. This conventional management plane approach relies heavily on operator input and control. There is a movement towards autonomous control, i.e., AI-based network control. However, there is no generally agreed solution related to the concerns of AI safety, especially with closed-loop Reinforcement Learning (RL) systems. Some thoughts related to solutions include the design of the AI system itself to incorporate some safeguards to prevent negative actions, use of multiple AI systems that check their actions against one other (for example, majority decision on the correct action to take), or testing of the AI system on a small scale domain until it has shown to not take negative actions over some lengthy testing time.

There are limitations of these current solutions as follows. First, the ability of the AI system design to avoid negative actions is dependent on how well the reward system encourages/discourages the selection of outcomes based on past outcomes. Second, each domain level AI system instance, albeit with the same trained model, could learn differently, resulting in chaos with respect to service/network/slice behaviors. Third, the reward function may become neutral, i.e., bypassed, or ineffective in influencing outcomes as the AI system learns to expand the set of possible actions and/or outcomes. Fourth, the use of multiple AI systems does not eliminate the potential for multiple systems to agree on negative actions or to separately learn inappropriate behaviors. Fifth, testing of an AI system on a small scale environment does not avoid the potential that the behaviors of the AI system will either not work in the larger environment or that the AI system will modify its behaviors as it learns and eventually incorporates negative behaviors.

BRIEF SUMMARY OF THE DISCLOSURE

The present disclosure includes a method, a non-transitory computer-readable medium with instructions, and an apparatus, each configured to perform steps of obtaining telemetry data associated with a network having a plurality of network elements; presenting a list of ongoing issues and predicted issues based on the telemetry data, on a display; responsive to a selection of an issue that is one of the ongoing issues and the predicted issues in the list, presenting a root cause analysis of the issue including one or more diagnosis; presenting a list of prescriptive actions on the display to address the issue based on the root cause analysis including a mechanism for a user to cause execution of any of the prescriptive actions; and receiving a selection of one or more of the prescriptive actions from the user. The steps can further include presenting a predictability factor of how reliable the root cause analysis is to the issue; and, responsive to the selection of the one or more of the prescriptive actions, updating the predictability factor in the display.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
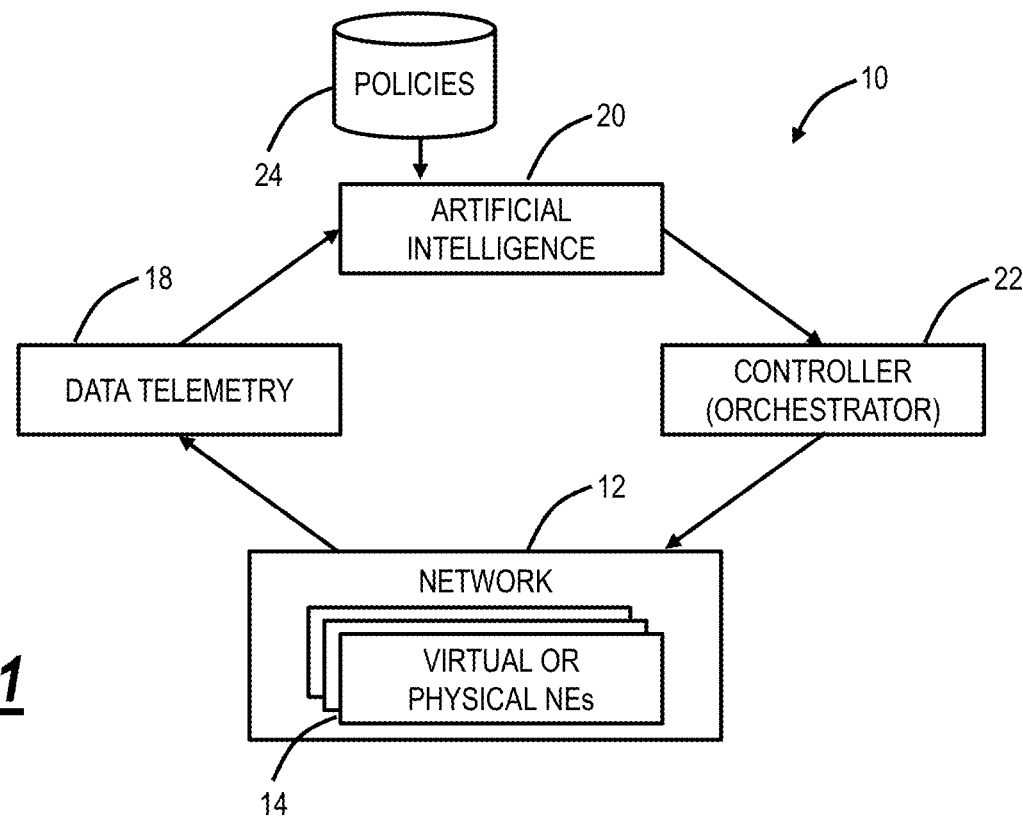
FIG. 1 is a block diagram of an AI-driven feedback loop for adaptive control of a network.

The present disclosure relates to systems and methods for proactive network operations. The systems and methods may include a network operations software ("software application") executed on a processing device communicatively coupled to a network and focused on issue remediation. The software application presents ongoing issues and alarms, predicted issues and alarms likely to occur in the future, etc. The software application can include predicted severity, which presents an aggregate measure of a number of factors, including the urgency of the issue (on-going versus forecasted), service impact (Service-Affecting (SA) versus Non-SA (NSA)), and severity (Critical, Minor, etc.). The software application can include remediation steps to solve an issue, e.g., with actions may be displayed in the user interface only, or be actionable for close-loops. Further, the software application can include a use case editing function allowing network operators to design remediation workflows.

The software application significantly improves usability and acceptance by Network Operations Center (NOC) operators of AI-based software for proactive network operations and closed-loop automation. With proactive network operations and closed-loop automation, network operation leads to improved customer satisfaction by reducing the number of service outages, reduced cost of operations by reducing truck rolls and spares inventory, improved customer retention by providing a higher quality of experience, improved time to restoration for known issues helps avoid Service Layer Agreement (SLA) penalties.

The software application augments and integrates with existing NOC processes, without forcing users to change the operations role fundamentally. It learns from users' interactions and performs advanced machine learning in the background automatically, without requiring operators to have expertise about ML.

Today's network operators react to problems instead of proactively preventing them and lack visibility about the big picture of the network. In theory, modern big data and artificial intelligence technologies have the potential to address these problems. However, in practice, it is not realistic to expect that network operators will change their staff and their processes for AI technologies. It should be the other way around: AI technologies should integrate with existing NOC processes for adoption. This present disclosure provides a Network Health Predictor User Interface (UI) and User Experience (UX), in the software application, for a Proactive Network Operation (PNO) solution. The UI/UX is designed to integrate with existing NOC processes. Furthermore, the UI/UX covers all main aspects network health, namely: prediction of issues before they occur, root-cause analysis of ongoing issues, and suggestion of remediation actions, with a single pane of glass.

Also, in various embodiments, the present disclosure relates to systems and methods to detect abnormal behavior in networks using supervised machine learning and using probability distributions derived from unlabeled multivariate data. The systems and methods can be implemented through the software application. The systems and methods utilize big data and machine learning on datasets from the network with associated algorithms to develop actionable insights based thereon. The software application can be in a NOC or the like and can continuously operate to provide actionable insights. In this manner, the software application can provide valuable analytics to assess current and potential future network health. The software application uses training data associated with normal network operations and once trained, the software application can operate on ongoing network data to derive either probability of anomalies (such as on a per Network Element (NE) basis) or likely problems based on classification. Specifically, the software application can operate either with supervised learning, unsupervised learning, or both.

Advantageously, the machine learning described herein enables the software application to learn the thresholds on various performance monitoring metrics and what is normal/abnormal, removing the requirement for expert involvement. The software application described herein can operate with supervised and/or unsupervised learning techniques. In an application, the software application can be referred to as a Network Health Predictor (NHP) which can cooperatively operate with existing network management platforms to complement the existing alarm/alert systems. The NHP can proactively provide actionable insights into network activity including proactive alerts for maintenance in advance of failures or faults, smart alarming which reduces the need for subject matter experts in network management by correlating multiple alarms for root cause analysis, and the like.

The software application of the systems and methods uses relevant Performance Monitoring (PM) data to describe the behavior of a telecommunications network. The network can include an optical layer (e.g., Dense Wavelength Division Multiplexing (DWDM), etc.), a Time Division Multiplexing (TDM) layer (e.g., Optical Transport Network (OTN), Synchronous Optical Network (SONET), Flexible Ethernet (FlexE), etc.), a packet layer (e.g., Ethernet, Multiprotocol Label Switching (MPLS), Internet Protocol (IP), etc.), and the like. Those skilled in the art will recognize actual network implementations can span multiple layers. The software application can operate at a single layer or concurrently at multiple layers. Each of these layers can include associated PM data, which describes the operational status over time at the layer.

Examples of PM data include, without limitation, optical layer data, packet layer data, service and traffic layer data, alarms, hardware operating metrics, etc. The optical layer data can include pre-Forward Error Correction (FEC) Bit Error Rate (BER), post-FEC BER (estimate), number of corrected errors, chromatic dispersion, Polarization Dependent Loss (PDL), Estimated Optical Signal to Noise Ratio (OSNR), latency, TX power, RX power (total, individual channels), power loss, Q factor, fiber type and length, etc. The packet layer data can include port level information such as bandwidth, throughput, latency, jitter, error rate, RX bytes/packets, TX bytes/packets, dropped packet bytes, etc. The service and traffic layer data can be Time Division Multiplexing (TDM) Layer 1 (L1) PM data such as Optical Transport Network (OTN). The packet layer data can be associated with a device port while the service and traffic layer data can be associated with a particular L1 connection/service. The alarm data can be various types of alarms supported by a network element (e.g., chassis, MPLS, SECURITY, USER, SYSTEM, PORT, SNMP, BGP-MINOR/WARNING/MAJOR/CRITICAL, etc.). The hardware operating metrics can include temperature, memory usage, in-service time, etc.

Throughout, the term network elements (NE) can interchangeably refer to a variety of network devices, such as nodes, shelves, cards, ports, or even groups of such NEs. No matter the identity of the elements, however, the technique described herein for determining the normalcy of their behavior remains identical and remains valid as long as the relevant PM data for each element are accessible to the anomaly detection software application.

AI-Driven Adaptive Networks

FIG. 1 is a block diagram of an AI-driven feedback loop 10 for adaptive control of a network 12. The network 12 includes network elements 14, which can be physical and/or virtual network elements. The physical network elements can include switches, routers, cross-connects, add-drop multiplexers, and the like. The virtual network elements can include Virtual Network Functions (VNFs) which can include virtual implementations of the physical network elements. The network 12 can include one or more layers including optical (Layer 0), TDM (Layer 1), packet (Layer 2), etc. In an embodiment, the network element 14 can be a nodal device that may consolidate the functionality of a multi-service provisioning platform (MSPP), digital cross-connect (DCS), Ethernet and Optical Transport Network (OTN) switch, DWDM platform, etc. into a single, high-capacity intelligent switching system providing Layer 0, 1, 2, and/or 3 consolidation. In another embodiment, the network element 14 can be any of an add/drop multiplexer (ADM), a multi-service provisioning platform (MSPP), a digital cross-connect (DCS), an optical cross-connect, an optical switch, a router, a switch, a Wavelength Division Multiplexing (WDM) terminal, an access/aggregation device, etc. That is, the network element 14 can be any system with ingress and egress signals and switching of packets, channels, timeslots, tributary units, wavelengths, etc. The network 12 can be viewed as having a data plane where network traffic operates and a control plane (or management plane) where control of the data plane is performed. The control plane provides data telemetry 18 during operation. The data telemetry 18 can include, without limitation, Operations, Administration, Maintenance, and Provisioning (OAM&P) data, Performance Monitoring (PM) data, alarms, and the like.

An Artificial Intelligence (AI) system 20 can receive the data telemetry 18, provide the data telemetry 18 as inputs to data-driven training and inference models, and provide results to a controller (or orchestrator) 22 for network control. The controller 22 is configured to modify/update the network elements 14 based on feedback from the AI system 20. The AI system 20 can be a server, network controller, SDN application, cloud-based application, etc. The AI system 20 is a processing device which receives inputs (the data telemetry 18) and provides outputs to the network controller 22 for automated control of the network 12. The AI system 20 can also be referred to as an ML inference engine. Various techniques for AI control, ML, etc. are contemplated. Some examples are described in commonly-assigned U.S. patent application Ser. No. 16/185,471, filed Nov. 9, 2018, and entitled "Reinforcement learning for autonomous telecommunications networks," U.S. Pat. No. 10,171,161, issued Jan. 1, 2019, and entitled "Machine learning for link parameter identification in an optical communications system," U.S. patent application Ser. No. 16/251,394, filed Jan. 18, 2019, and entitled "Autonomic resource partitions for adaptive networks," and U.S. patent application Ser. No. 15/896,380, filed Feb. 14, 2018, and entitled "Systems and methods to detect abnormal behavior in networks," the contents of each are incorporated by reference herein.

The AI-driven feedback loops 10 can play an instrumental role in adaptive network systems. Such systems need response time, i.e., time to compute the probability of an outcome given input data, to be fast for identifying the optimal action to take to change network/service state. This is a complex decision needing to consider, as input data patterns, many network/service state, and other business policies 24.

Generally, two broad types of AI can be used to drive "closed loops" by the AI system 20, namely 1) supervised or unsupervised pattern-recognition algorithms can be used to understand what is happening in the network 12 (see U.S. patent application Ser. No. 15/896,380 noted herein), and 2) reinforcement learning can be used to decide what actions should be taken on the network 12 (see U.S. patent application Ser. No. 16/185,471 noted herein).

Figure 2:
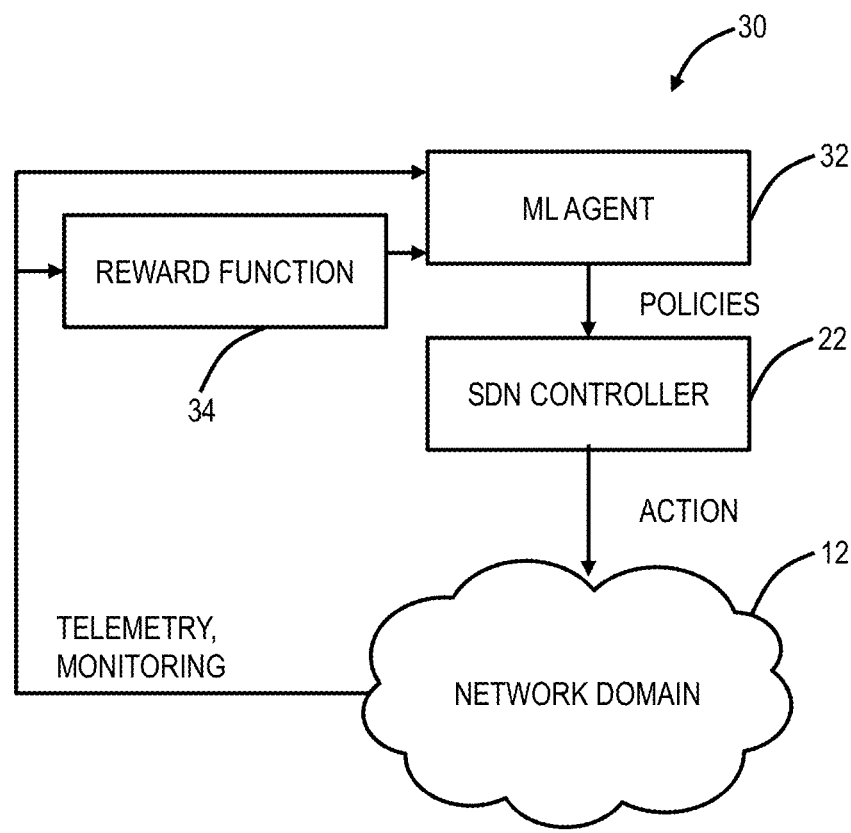
FIG. 2 is a block diagram of a Reinforcement Learning (RL) system.

FIG. 2 is a block diagram of a Reinforcement Learning (RL) system 30. Reinforcement Learning can be used for "closed loop" applications where there may not be a need for human supervision and the AI system 20 can independently derive state information from the environment and decide on actions to affect that environment, e.g., a service or resource instance in a given network domain. In FIG. 2, the RL system 30 includes the network 12 which provides telemetry and monitoring data to an ML agent 32 and to a reward function 34 which provides input to the ML agent 32. The ML agent 32 can be the AI system 20 and provides an interpreter function observing the environment via the telemetry and monitoring data for current state information and determining the actions required to achieve a target state. The reward function 34 is used by the AI system 20 to maximize the probability, and thus reinforcing behavior, of achieving the target state.

Typically, the RL system 30 is initially trained on a large data set in order to give it a base set of operational policies for business/service/network target states to invoke or maintain based on the state of the environment, then the RL system's 30 inference model continues to learn and refine its behavior as it is exposed to the real-world behaviors and observes the results of its actions there. In some cases, the RL system 30 may need to experiment with an available set of possible actions constrained by operational policies while attempting to find the optimal action. In some cases, the operational policies themselves could be refined, i.e., dynamic policy, based on observed current state as well as actions taken in previous attempts.

RL includes defining costs and rewards to quantify network actions, determining allowed network actions, and defining metrics describing a state of the network 12; obtaining network data to determine a current state based on the defined metrics; and determining one or more of the network actions based on the current state and based on minimizing the costs and/or maximizing the rewards. That is, RL includes rewards/costs which set the objective/goal, a state which defines where the network 12 currently is relative to the objective/goal, and network actions which are used to drive the state towards the objective/goal.

Other types of Machine Learning (ML) can be used to drive closed-loop network applications, notably: pattern-recognition and event-classification techniques such as Artificial Neural Networks (ANN) and others. In this case, a set of raw inputs from the telemetry and monitoring data can be turned into a higher-level insight about the network state, which in turn can be used to decide how to take actions to modify the network 12. For example, collections of performance monitoring data can be interpreted by an AI as: "there seems to be a congestion happening on link X affecting services ABC," "bandwidth allocated to service D should become under-utilized for the next 8 hours and could be used elsewhere," "behavior of device Y suggests a high risk of failure within next 2-3 days," etc. As a result, network policies could take automated actions such as re-route low-priority away from link X, re-allocate some of the service D bandwidth to other services EFG or re-route services away from device Y and open a maintenance ticket.

Proactive Network Operations Application

Network operators troubleshoot network issues continuously, and most issues are repetitive in nature. The workflow is almost always the same, namely i) some performance or event triggers a fault that generates a ticket, ii) each ticket is owned by a network operator, and they triage and troubleshoot that issue, iii) data is collected, inferences are generated, and a root cause is identified, and iv) based on the root cause, certain actions are performed to resolve the issue.

There is a large amount of knowledge in each experienced network operator's mind that is used to solve such issues quickly. However, this information is seldom shared; rather, it is gathered over time.

Runbooks and rule-based scripts are common techniques to automate basic and repetitive tasks. That said, but this does not leverage AI/ML to learn patterns from the NOC workflow actions that are taken every time some issue hits the network. To date, AI has mainly been applied to performance data to find patterns and trends.

The present disclosure provides a way for network operators to provide feedback from every issue they troubleshoot into an intelligent AI-based solution. This feedback along with all the data collected from the NOC workflow mentioned above enables the production of highly accurate root cause determinations and remedial actions. The present disclosure includes the software application for Proactive Network Operations (PNO) with two areas of focus, namely capturing feedback that improves root cause and remediation prescription accuracy, and leveraging this data and feedback to focus on predicting similar failures ahead of time and prescribing the same highly accurate root cause and prescriptions trained using the network operators' collective feedback and knowledge. The PNO application can also improve its performance and accuracy through constant training and feedback to improve the number of issues AI can predict over time. Further, the PNO application is multi-vendor and multi-layer. It is agnostic to what use case it is trying to automate.

Features of the PNO Software Application

The PNO software application can be implemented on the AI system 20 receiving the data telemetry 18 and outputting alerts, suggestions, remedial actions, and workflows. Key features of the PNO software application include a single point for monitoring data utilizing Application Programming Interfaces (APIs) or other techniques to obtain data from various devices, etc. The PNO software application can also include Representational State Transfer (REST) APIs for connectivity. The data collection of the PNO software application from the data telemetry 18 can include, for example, Command Line Interface (CLI), Syslog, Simple Network Management Protocol (SNMP), as well as custom integration techniques with various vendor's Element Management Systems (EMSs), Network Management Systems (NMSs), etc. The PNO software application can also be integrated with event and fault management systems to collect real-time events and faults for correlation with other performance data to find the root cause.

The PNO software application can include ticketing or service desk integrations. This enables the PNO software application to collect ticket information. The PNO software application has a 1:1 mapping of each ticket so the network operator can search for the same ticket and open it in the PNO software application to find more data related to the incident. The PNO software application can use this data as labels for supervised learning and keep a trend of all related issues and tickets for the root cause, remediation action accuracy improvements. Also, the PNO software application can open tickets for any issues it has predicted and provide such tickets via the ticketing or service desk integrations.

The PNO software application includes data collection and triage automation. There are two types of actions a network operator performs, namely action to collect data for the intent to troubleshoot/triage the issue, and action to implement actions for the intent to solve the issue. The PNO software application includes a collection of a set of command outputs regularly collected for troubleshooting the issue, the ability to collect more/other command outputs, and the ability for parsing the output and based on the outcome gather more data (rules-based).

The PNO software application can track each ticket and determine probable root causes based on previous training. The probable root causes can be provided to the operator for selection, and the selection can provide feedback by editing existing root causes or adding new ones. Based on the root cause selection, the correct remediation actions can be presented for execution, either manually or automatically, such as using the controller 22. Operators provide feedback by editing existing prescriptions or adding new ones.

The PNO software application can proactively find patterns and trends in i) tickets and incidents, ii) events and faults, and iii) performance metrics, and predict issues in advance. These predicted issues can be opened as a ticket in a ticketing tool with contextual information for the imminent failure.

PNO Software Application

Figure 3:
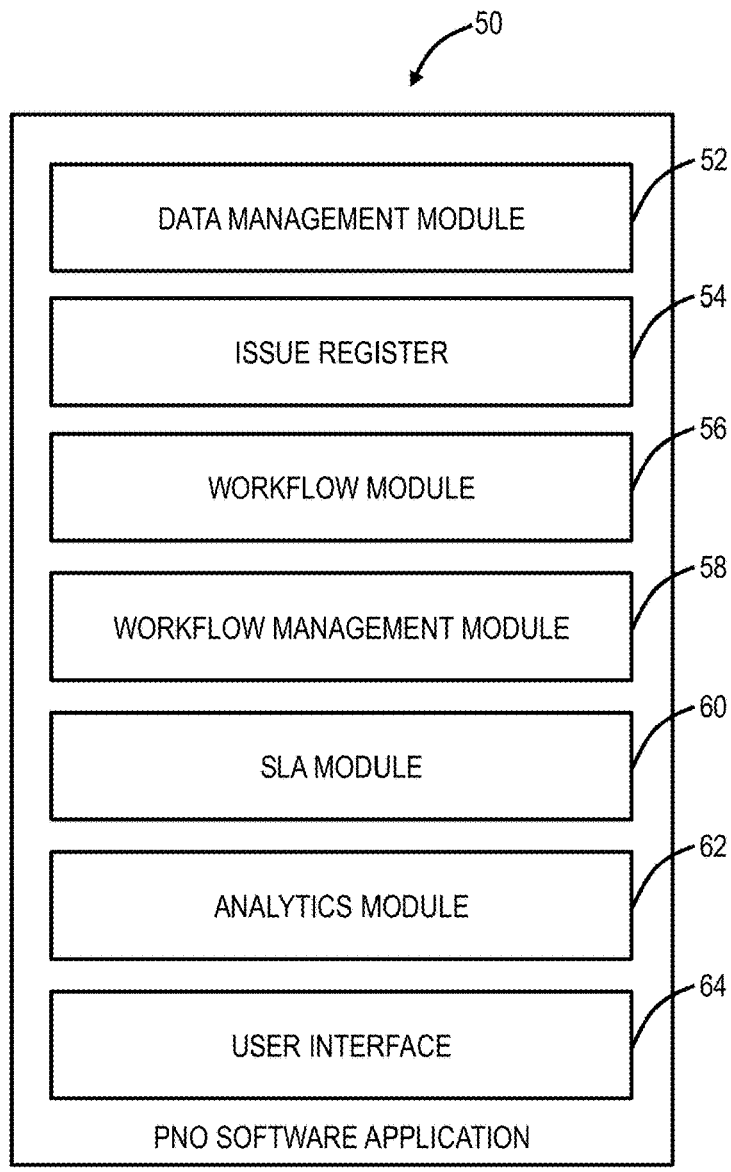
FIG. 3 is a block diagram of software modules in a Proactive Network Operation (PNO) software application.
Figure 3:
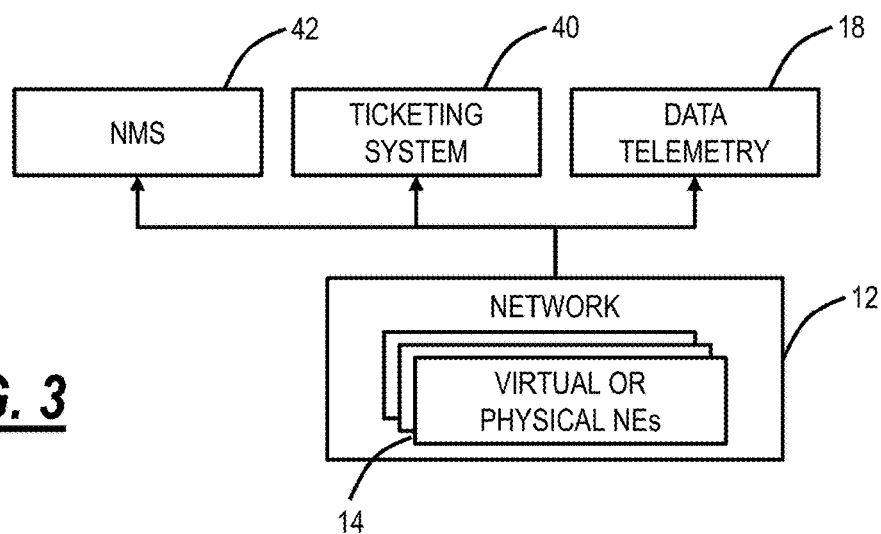

FIG. 3 is a block diagram of software modules in a PNO software application 50. The PNO software application 50 is executed on a processing device that is communicatively coupled to the network 12 and configured to obtain the data telemetry 18. The PNO software application 50 can also be connected to a ticketing system 40 that is configured to create and manage tickets.

The PNO software application 50 includes a data management module 52, an issue register 54, a workflow module 56, a workflow management module 58, an SLA module 60, an analytics module 62, and a user interface 64.

The workflow generally includes an incident occurring or predicted to occur in the network 12. The PNO software application 50 assigns an issue file to an incident. The issue file is used for the remediation of the issue. Feedback is gathered through the process, and the issue file can be updated based on the feedback. Generally, operations personnel are guided by the issue file to resolve an incident whereas experienced personnel can edit, add, revise issue files as well as rate and assign issue files to quarantined incidents (ones that the PNO software application 50 has trouble assigning issue files to).

The data management module 52 is configured to manage and obtain data for use in the PNO software application 50. For example, the data management module 52 can be configured to interface to multiple data sources. In an embodiment, the data management module 52 can utilize Apache NiFi for the data flow. The types of data can include network topology information, inventory information, PM data, ticket data, and the like. The data management module 52 can obtain the data via connectivity to a management system 42, the orchestrator 22, a control plane, direct to the network elements 14, etc. Various protocols can be used to obtain the data include SNMP probes, ping, Transaction Language 1 (TL1), CLI, Syslog, etc. Ticket data can be obtained from various different ticketing systems 40 such as Netcool, Remedy, etc. The data management module 52 can leverage APIs or other integration techniques to integrate with various tools.

The data management module 52 includes an ability to display a list of devices (the network elements 14), including devices discovered through various approaches. The data management module 52 understands each device's capability for data collection, e.g., does it support SNMP, CLI, Syslogs, Netflow, etc. The data management module 52 can physically access any of the devices such as through telnet or other approaches. Also, the data management module 52 can send periodic messages ("keepalive") to devices to ensure connectivity and the devices are operational. The period can be configurable (e.g., an hour, a day, once a week, once a month, etc.).

The data management module 52 provides the ability to manage the device from an Operations, Administration, Management, and Provisioning (OAM&P) perspective as well as configuring PMs on the device. That is, the data management module 52 can be a management interface to the device.

To add one or more devices to management, the data management module 52 can support a configuration process. For example, a user can select one or more devices through the user interface, such as via entering addressing, geographic coordinates, etc. Once selected, the data management module 52 includes polling the devices for supported SNMP Management Information Bases (MIBs) and Object Identifiers (OIDs). The data management module 52 can auto select OIDs based on the device type and check the ability to collect data. The data management module 52 can also be configured to select threshold settings, polling duration, etc. In an embodiment, the data management module 52 can create a NiFi process to the device to start collecting data based on a known schema.

The data management module 52 can also connect to the ticketing system 40 to pull incident data, including number, severity, timestamp, logs, device ID, etc. Further, the data management module 52 can also push data to the ticketing system 40 to create a ticket based on predictions in the PNO software application 50.

The issue register 54 is a register of all case files in the PNO software application 50. This is the master database of all issues being tracked by the PNO software application 50. The issue register 54 can be per device, per device type, and/or per vendor. This enables vendor or device issue register updates without updating the complete database.

An issue file in the issue register is a file on a specific problem that has a unique solution. The issue register 54 can track the accuracy percentage of each file for the corresponding problem, based on total hits, feedback, etc. Each issue file can include version control with an ability to roll-back. The objective is to audit issues and use such feedback to update the issue file.

An incident report is data for a specifically identified problem with a root cause classified. The incident report can have an identified owner, e.g., who owned the incident and resolved it. The incident report can include a Root Cause Analysis (RCA) and evidence, i.e., data collected about the incident. The RCA can be updated as new information is collected when similar incidents happen. There could be multiple RCA's for the same incident. AI can be used to do two things, namely 1) gather more data in the network when this issue happens to identify hidden correlations that can differentiate different RCAs, and 2) determine which RCA is used in what type of situation.

The issue file can include a prescription manager where recommendations are provided. The recommendations are tied to the RCA. There are two types of prescriptions, a collection prescription and an action prescription. The collection prescription includes a request to collect information of a particular type that is relevant to the incident. The collection prescription can include a rules engine that can allow processing capabilities to parse for specific output and based on that request more information. The action prescription includes a rules engine that allows a policy action and is based on a trigger which could be from the collected data or an action based on a manual entry.

The workflow module 56 allows NOC operations personnel interaction for an incident. For example, a user can resolve an incident using the management system 42 with the workflow module 56 an additional process for guidance. The workflow module 56 can include an incident manager which can display incidents for search, view, display, etc. An incident report widget can show all incidents that are currently open and assigned to the user. Also, incidents can be open reactively (from the data) or predictively based on the analysis. Incidents that were predicted can be noted with some indicator, e.g., a "P" listed next to the incident.

The workflow module 56 can list incidents such as in a row, table, list, etc. Each item for an incident can include the severity of the issue (e.g., color-coded, sorted, etc.), a time the ticket was raised, the ticket number, a subject, an impact factor, etc. Selection of an issue (e.g., click on) can open the corresponding issue file.

The issue file can include a device/service section, issue details, evidence, a topology visualization, feedback, and settings. The device/service section includes a device name, a technique to access the device (e.g., a Uniform Resource Locator (URL), a device type, version, device running configuration, etc. The issue details include a potential issue description, a potential root cause, and recommended actions (prescription). The potential issue description can include an alphanumeric description, a history of how many occurrences, and a probability of issue accuracy for the current incident. The potential root cause can include an alphanumeric description, a history of how many occurrences, and a probability of issue accuracy for the current incident.

The recommended actions can include actions per root cause and an option to execute the action. The option to execute can include integration with the orchestrator 22 to select/review specific actions/scripts (there could be multiple actions on multiple devices) (used for feedback), select/review order of operation for actions (if changes made, changes are used for feedback), select date/time for action (a default could be immediate), and a button to execute.

The evidence section can include logs and other command output already collected from the device (based on prescription (collection) already defined). There can be an indicator of whether or not the logs were audited or not. The evidence section can include a list of commands and output collected, text boxes for user input, etc.

The topology visualization can display/provide a view into the network topology, e.g., based on logical topology or geo-referenced. A user can use topology visualization to interact with the network. For example, hovering over a device in the topology shows device details (IP address, version, device type), a device health score, a link to a configuration, an indication of configuration changes, any Key Performance Indicators (KPIs) above Threshold Crossing Alerts (TCAs), a link to a device health page, etc. A user has an ability to select devices that are impacted by an incident (and this can be feedback improve performance).

The feedback can be used to receive a specific Issue description, a specific root cause, new/different root causes, a selection on the helpfulness of the prescription, an impact factor, etc. The idea of the feedback is to obtain data from the user and feed this back to impact the issue prescription and root cause identification.

The workflow module 56 is used to execute a sequence of actions, i.e., the various actions required to solve the issue. The workflow module 56 can interface with devices directly, or through one or more orchestration service via the controller 22 to execute all resolution steps from the same page. The data management module 52 can collect implicit feedback when the operator triggers the execution. This implicit feedback, which can be subsequently used to evaluate the accuracy of the proposed remediation actions, which is critical for effective deployability in the field; actual accuracy measurements enable dynamic pricing models and optimal SLAs; and automate the execution of those steps without human trigger whenever the measured accuracy and false positive rate are good enough.

The workflow management module 58 is used to define new issue files, edit existing issue files, process quarantined incidents. The expectation is an experienced technical leader interacts with the workflow management module 58. The workflow management module 58 can include a case manager which displays statistics of open, closed, and quarantined issues. Again, quarantined issues are ones that need to be manually investigated.

The quarantine module enables operators to isolate resources displaying abnormal behavior, but root cause (and associated remediation actions) is not known yet with good enough accuracy. This decouples work of short-term staff who needs to focus only on urgent service-affecting issues from long-term staff who has the mandate to improve the network itself. The resources in the quarantine may undergo additional more sophisticated analysis to refine prediction. This includes a mechanism to promote/demote resources from/to quarantine to/from Ops view. This promotion mechanism is collected as implicit feedback from NOC operator about prediction.

The workflow management module 58 can create new issue files either manually, based on an existing incident, or automatic. The manual creation can be based on user prompting. For either the manual creation or editing existing incidents, logs, PMs, and/or KPIs are selected, AI/ML, can evaluate existing issue files for similarities. If there is not a similar issue file, a new one can be created. The new issue file has a trigger condition (e.g., a TCA or the like). The correlation can be reviewed comparing historical data to determine a correlation confidence factor. The new issue file can have data defined for what to collect and what conditions need to be met, defined prescription—what actions to take for resolution.

The workflow management module 58 can be used to identify recurring patterns among network monitoring data, network alarms and operators' feedback, and pro-actively recommend creation and activation of corresponding use-cases. The objective here is to turn assurance use-cases into predictive use-cases, automatically over time, through this process.

The automatic creation can be based on analytics using AI/ML to determine pattern evaluation found in the network automatically. If it is determined to be closely related to a known issue, it can select the known issue. If it is not related to any known patterns, the new issue can be placed in quarantine for manual selection.

AI/ML can continue to evaluate known issue files to find trends and adjust the predictability factor. For example, the predictability factor can be 0-100%, 0=not predictable yet, <70%=needs more data but likely predictable, >70% means this issue can actually be predicted ahead of time, etc.

For new issue files, the workflow management module 58 can support researching data where a list can show KPIs at some point in time or current along with associated devices. A time-based correlation can occur for each event to find other KPIs and logs related to the event. A correlation matrix can be constructed with devices and KPIs. This can be used by a user to predict this issue in the future.

The workflow management module 58 can support evaluation of existing issue files to adjust the predictability score. The feedback mechanisms are designed to minimize user interaction to collect feedback required to improve machine learning algorithms and predictions, for instance, using active learning, semi-supervised learning, and few/single-shots learning. This includes both explicit feedback, and implicit (e.g., execution button, quarantine promotion, etc.). Advanced users may provide feedback about remediation actions associated with a root cause, and edit them as needed. The PNO software application 50 proactively uses user feedback to improve machine learning and predictions using techniques such as active learning, semi-supervised learning, and few/single-shots learning in particular.

The SLA module 60 can be used to illustrate operations improvements using the PNO software application 50. This can include various widgets displaying calculated information such as Total minutes' worth of time saved, Total potential Issues avoided, Total number of Issues predicted, Health score of regions/networks (zoomable), Total $$ Saved from all potential outages, Total Incidents closed with prescriptions, Total unique issues with accuracy of 80% or higher, Total # of hits on known issues, Total services prevented from impact, etc.

The PNO software application can include a health score to denote relative health. This can be displayed by color coding, numerical values, etc.

The analytics module can include logic to perform AI/ML on the data, such as log, historical data.

User Interface

Figure 4:
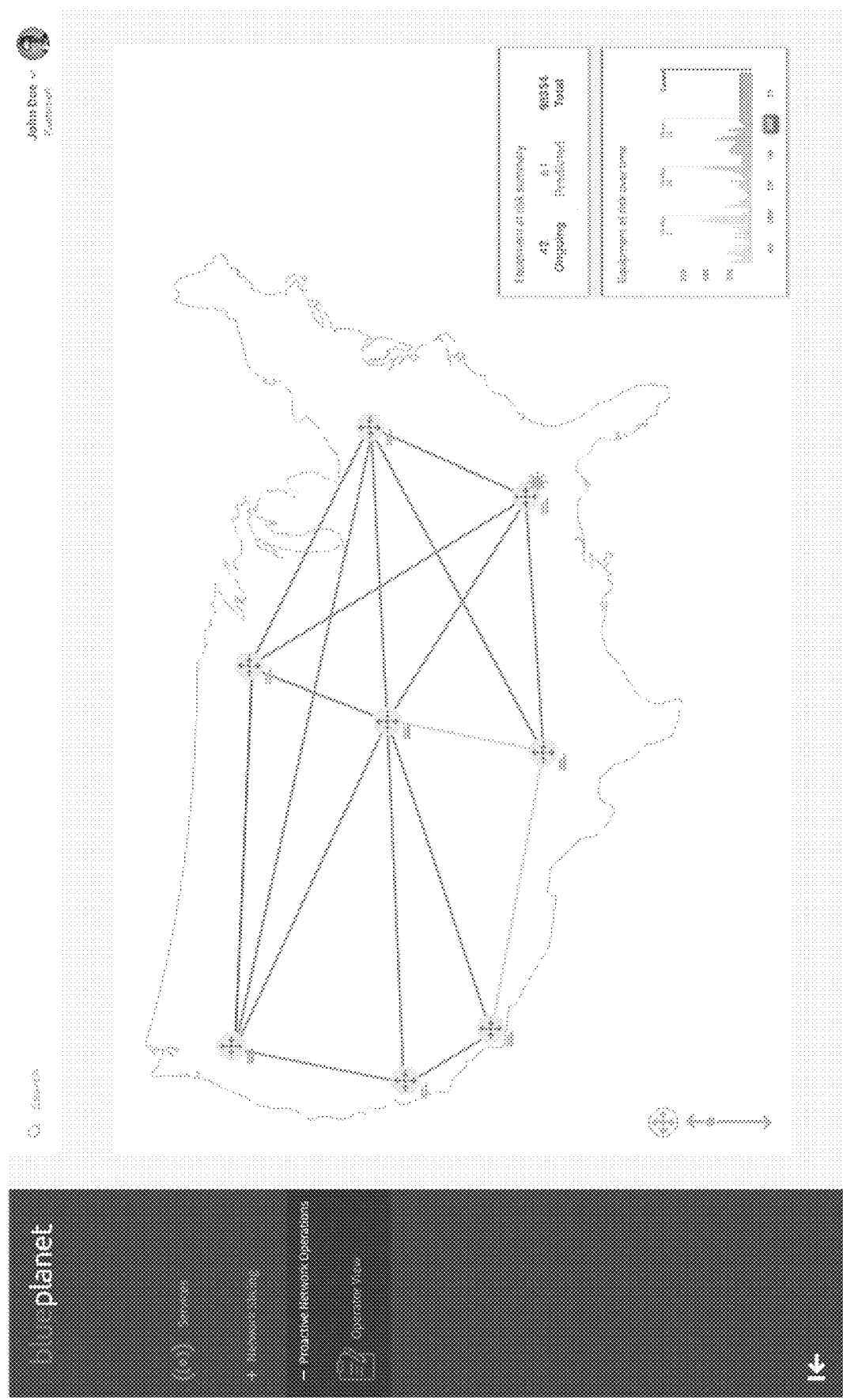
FIGS. 4-16 are screenshots of the user interface associated with the PNO software application of FIG. 3.

FIGS. 4-16 are screenshots of the user interface 64 associated with the PNO software application 50. FIG. 4 is a screenshot on the main operations page that includes a network map, a summary of the equipment at risk in the network, and a graph of equipment at risk over time. In this example, the network map is overlaid on a geographical map (US). The network map includes a topology display illustrating nodes and links, with color coding to indicate issues (green is no issue, yellow indicates problems). The summary of the equipment at risk includes ongoing issues, i.e., detected issues, and predicated issues, i.e., potential future issues identified through AWL analysis of ongoing telemetry data. A user may select any aspect in the screenshot to bring up additional pages, e.g., selecting a node, a link, the summary of the equipment at risk, etc.

Figure 5:
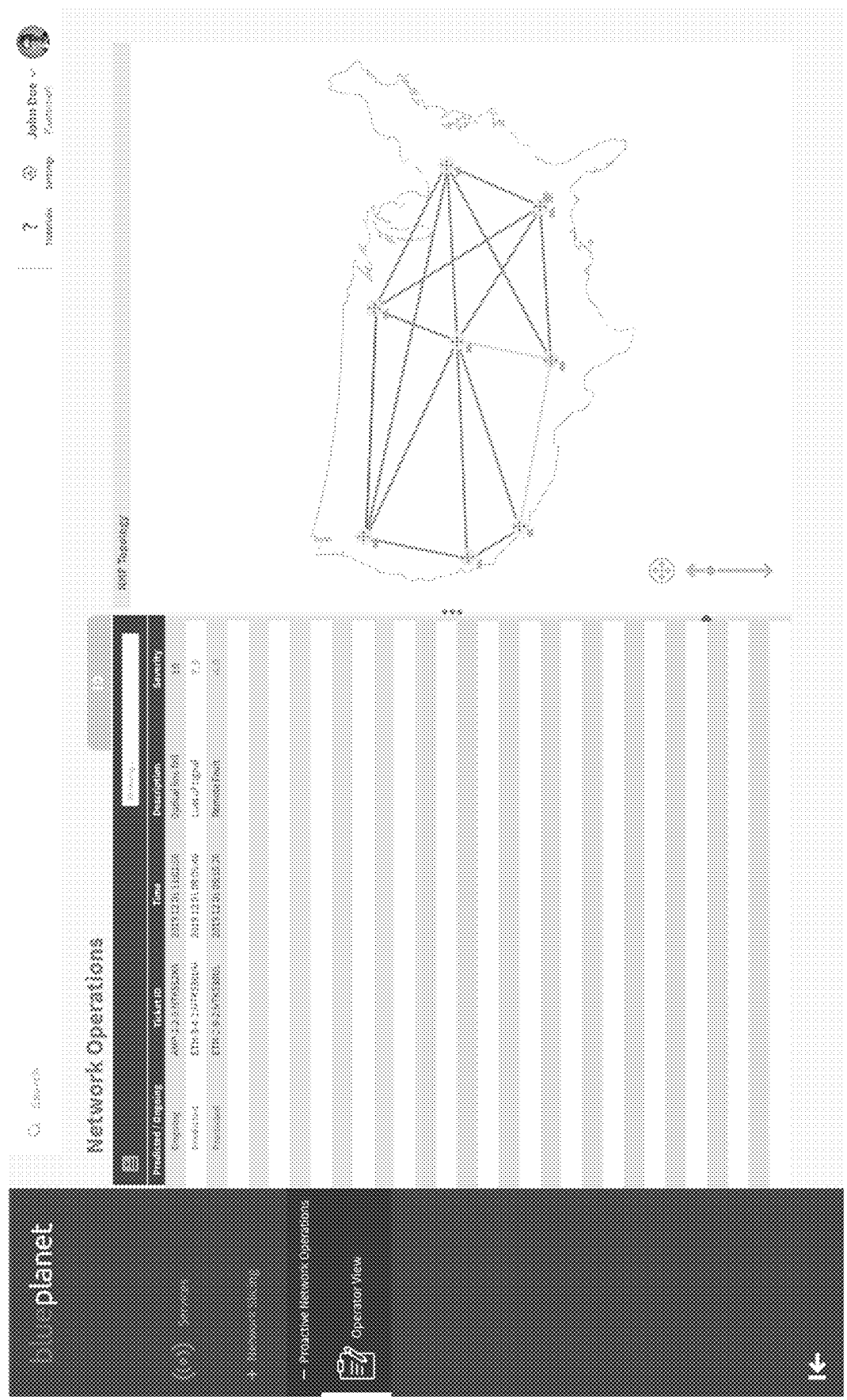

FIG. 5 is an operator view screenshot that is brought up by clicking on Operator View in FIG. 4. This brings up a list of current issues. The list can include whether the issue is predicted or ongoing, a ticket ID, a time, a description, and a severity level. In FIG. 5, the list includes one detected ongoing issue, namely an optical line failure with a severity of 10, and two predicted issues, namely a loss of signal with a severity level of 7.5 and a remote fault with a severity level of 4.0.

Figure 6:
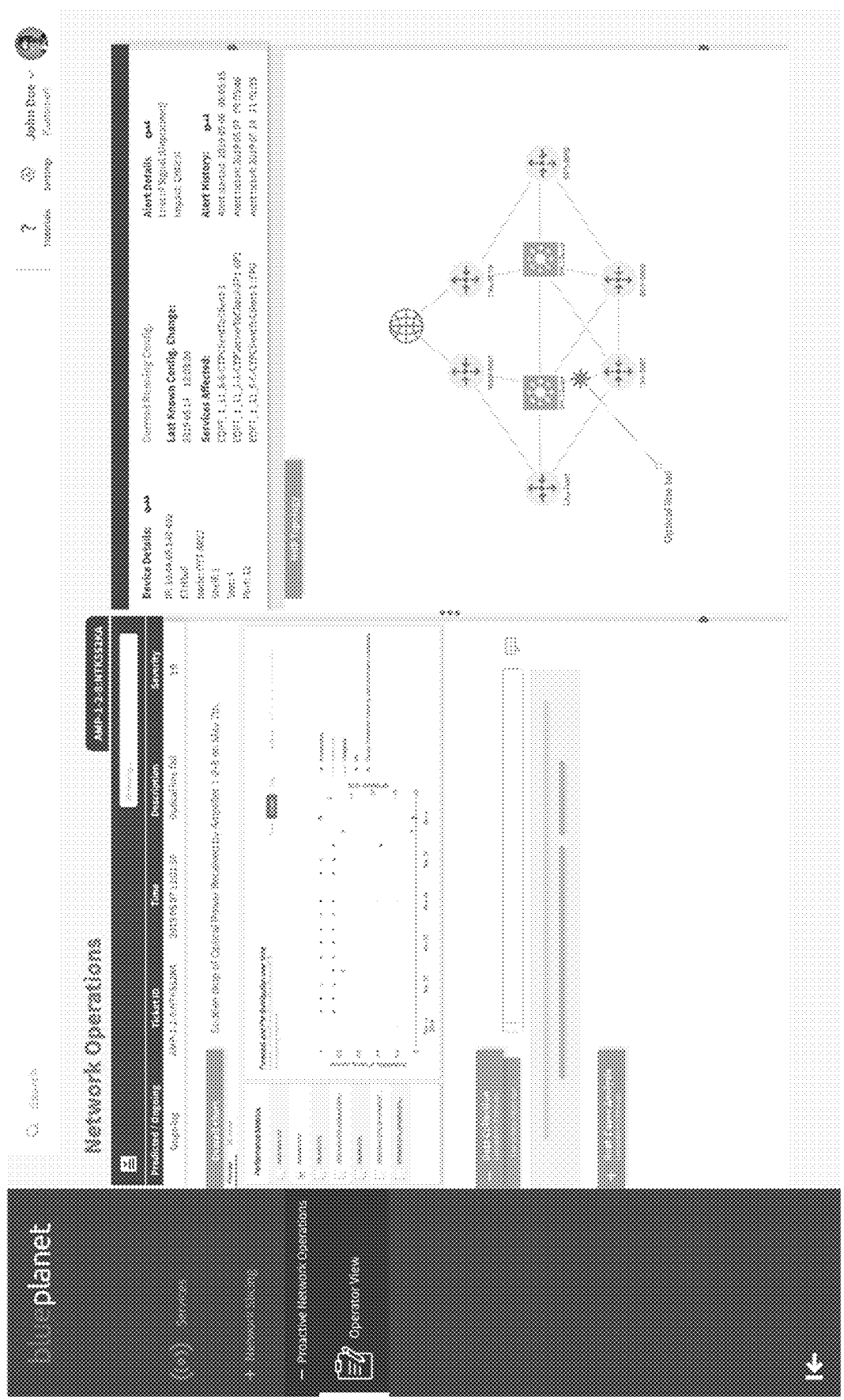

FIG. 6 is a detailed view of the ongoing issue from FIG. 5. Here, the user selects the ongoing issue in the list. FIG. 6 includes details on the ongoing issue, including an overall chart, data collection, root cause analysis, device details, and a topology view. The chart illustrates a PM distribution over time, and a user can select different PM values. The values are shown for detected values, predicted values, a threshold, etc. The device details provide details of the network device affected by the ongoing issue.

Figure 7:
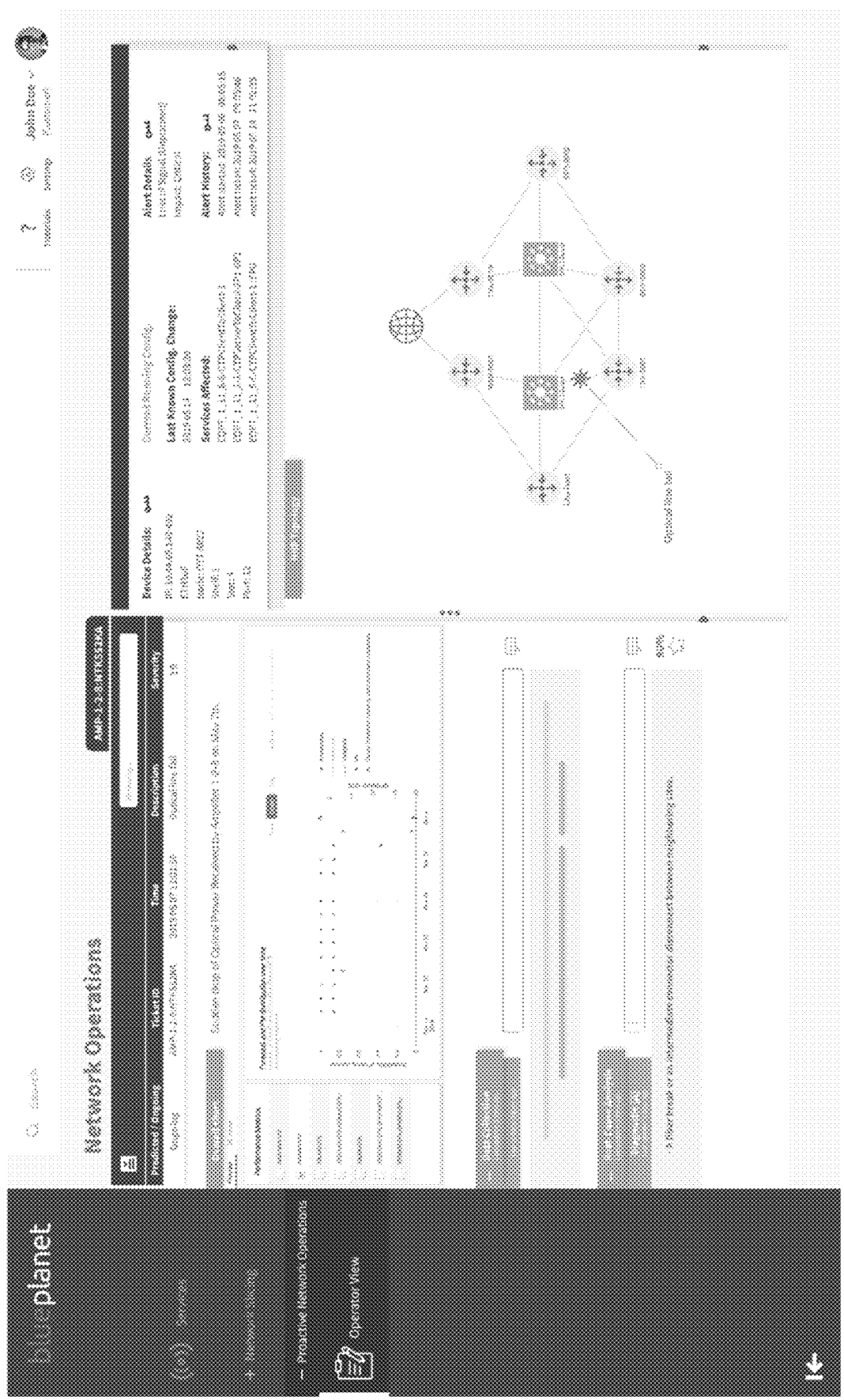

FIG. 7 is a detailed view of the root cause analysis from FIG. 6. Here, the user selects the root cause analysis. In FIG. 7, the PNO software application 50 determines what root cause best fits the ongoing issue. Here, the diagnostic is that there is a fiber break or an intermediate connector disconnected between neighboring sites. Also, the PNO software application 50 shows a 90% predictability factor meaning there is high confidence this is the root cause. Note, if there were an equipment failure, the root cause would not be designated as a fiber break or connector.

Figure 8:
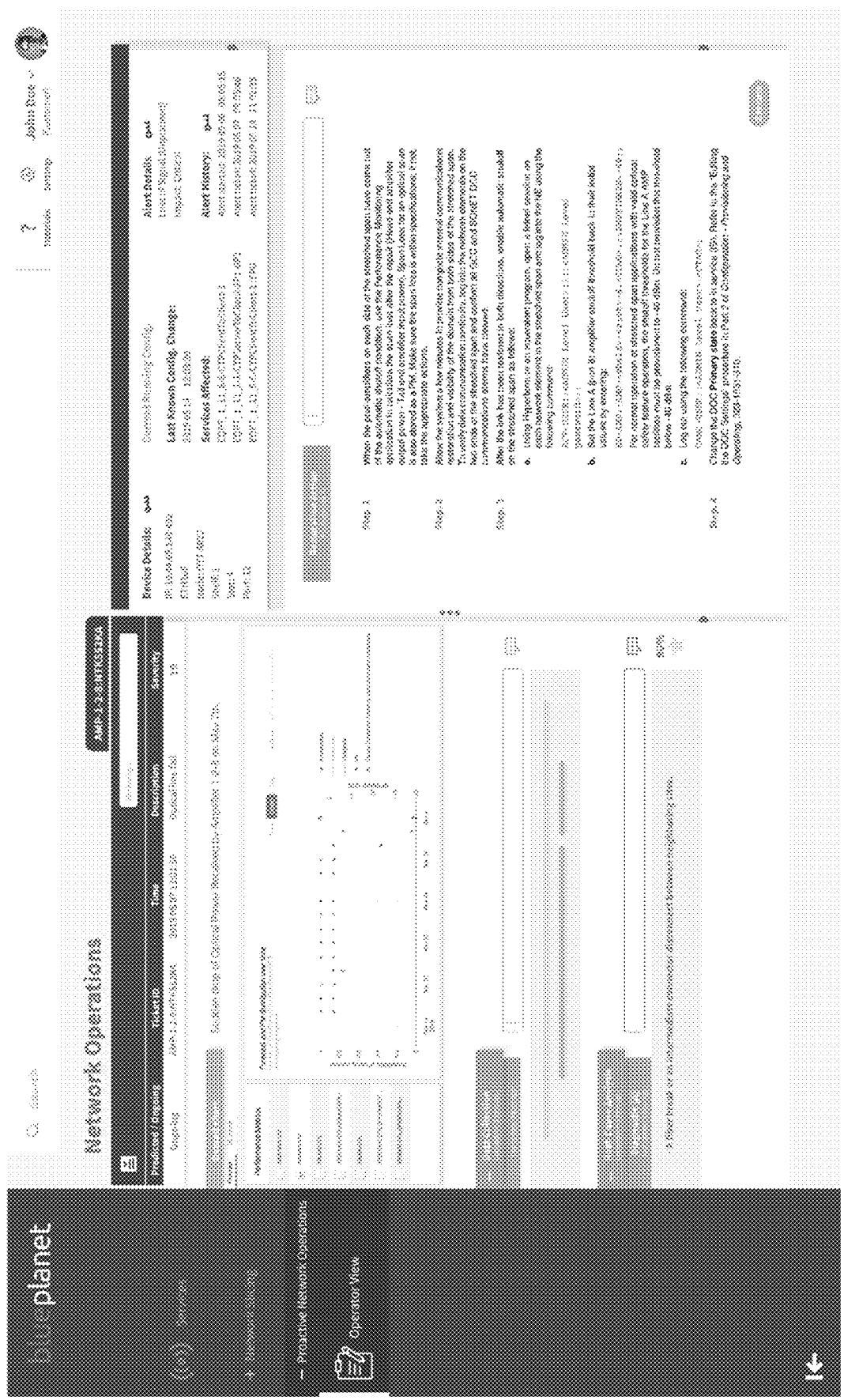

FIG. 8 is a screenshot of the restoration action recommended for the ongoing issue. Here, the user selects the star next to the root cause analysis to bring up a list of restoration actions. This includes step-by-step actions in detail for an operator to troubleshoot to resolve the ongoing issue. Further, this can include the appropriate commands. As described herein, the steps here for the restoration actions are predetermined and edited through the workflow management module 58.

Figure 9:
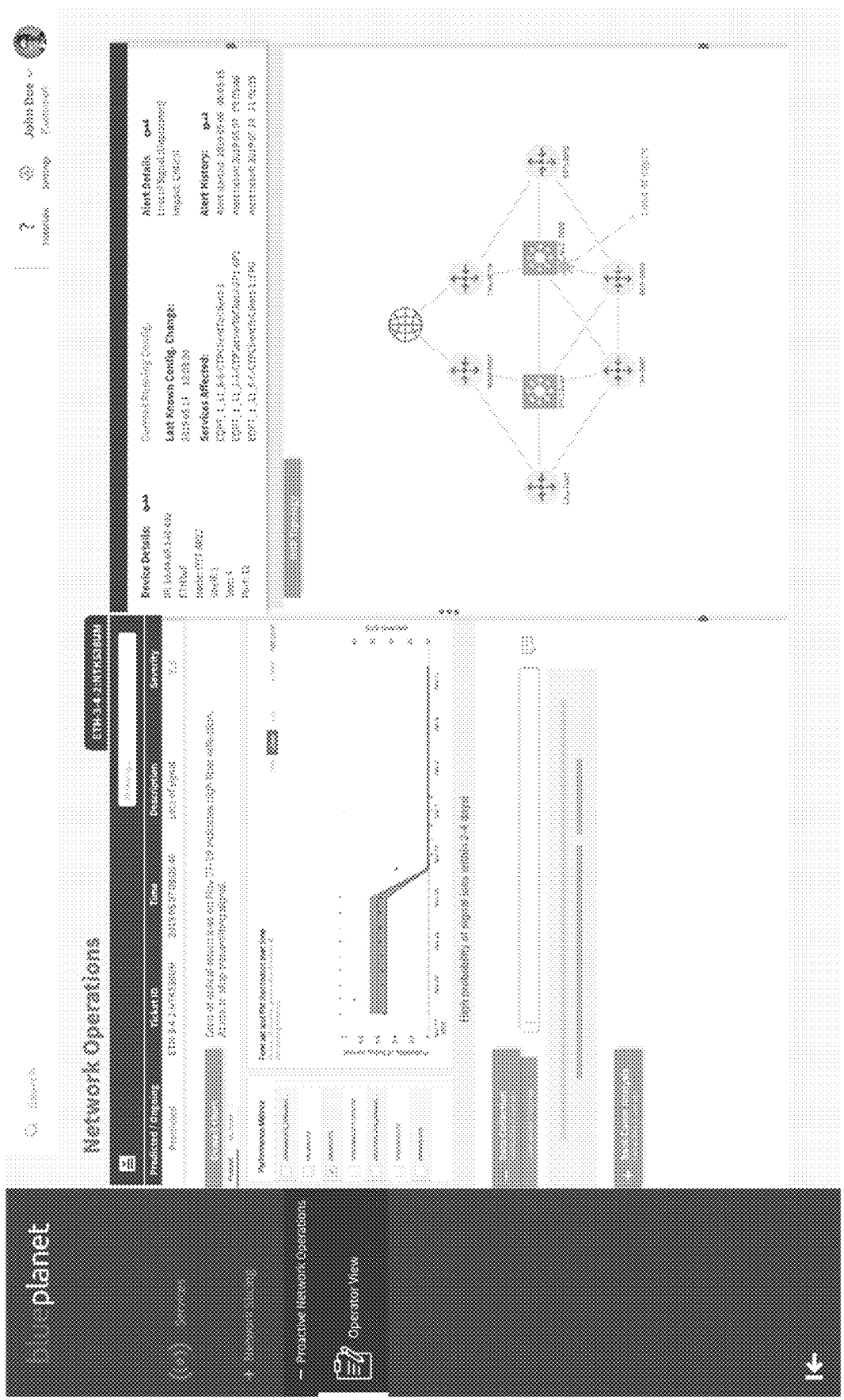

FIG. 9 is a screenshot of the predicted loss of signal issue. Here, the user has returned to the list in FIG. 5 and selects the predicted loss of signal issue. FIG. 9 is a detailed view of the predicted loss of signal issue. Similar to FIG. 6, the same type of information is presented for the predicted issue. The chart illustrates the forecast and PM data over time to indicate why the loss of signal is predicted. Here, the PNO software application 50 has determined a drop of optical return loss over a three day period indicating high fiber reflection and a corresponding risk to lose transmission. The PNO software application 50 notes that the predicted loss of signal issue has a high probability of occurring in the next 2-4 days.

Figure 10:
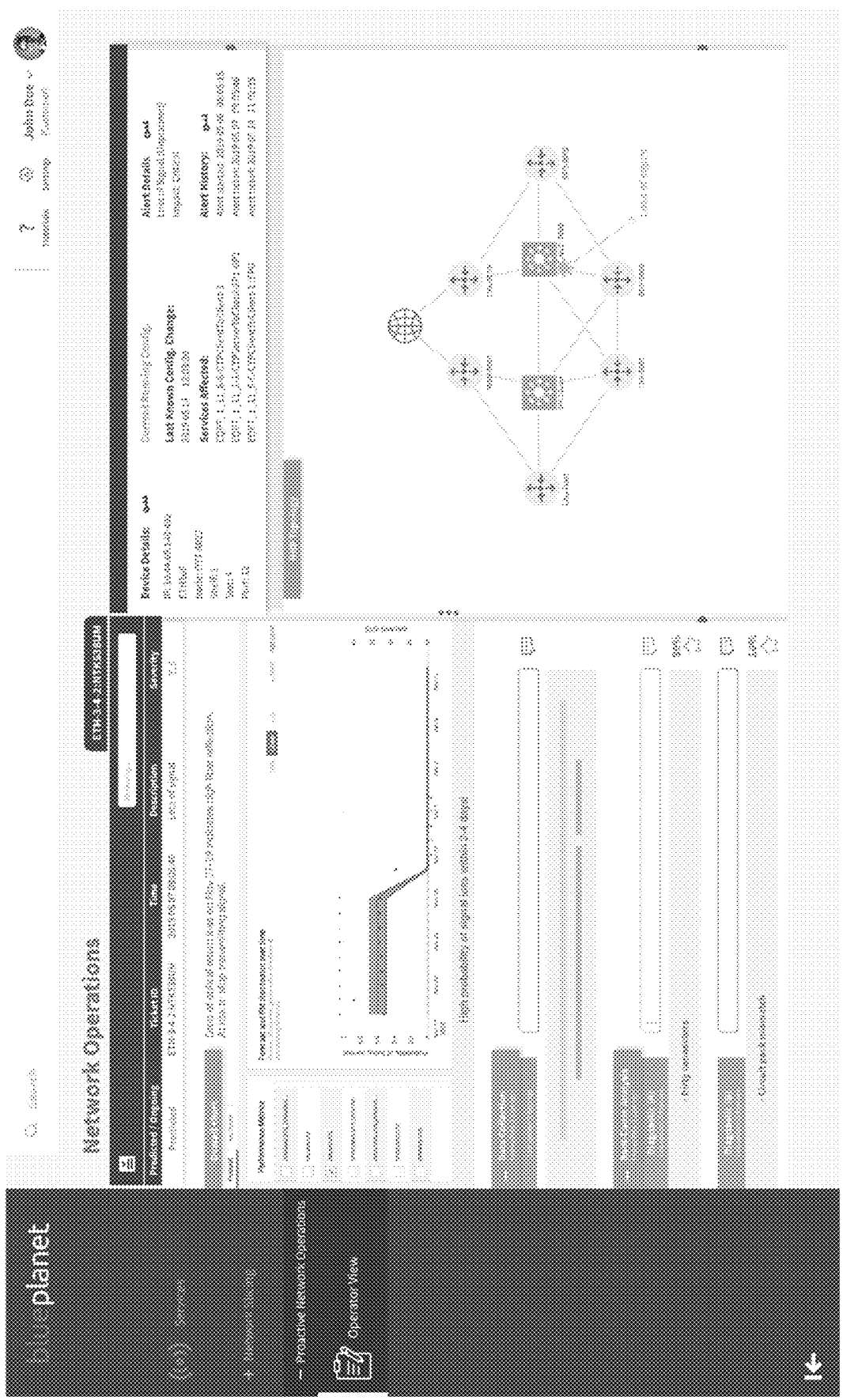

FIG. 10 is a detailed view of the root cause analysis from FIG. 9. Here, the user selects the root cause analysis. For the predicted loss of signal issue, there are two possible root causes, listed as diagnostic (A) of dirty connectors with a 90% predictability factor and diagnostic (B) with a 10% predictability factor. Due to these factors, the PNO software application 50 steers the user towards the dirty connector as the most likely cause to be addressed.

Figure 11:
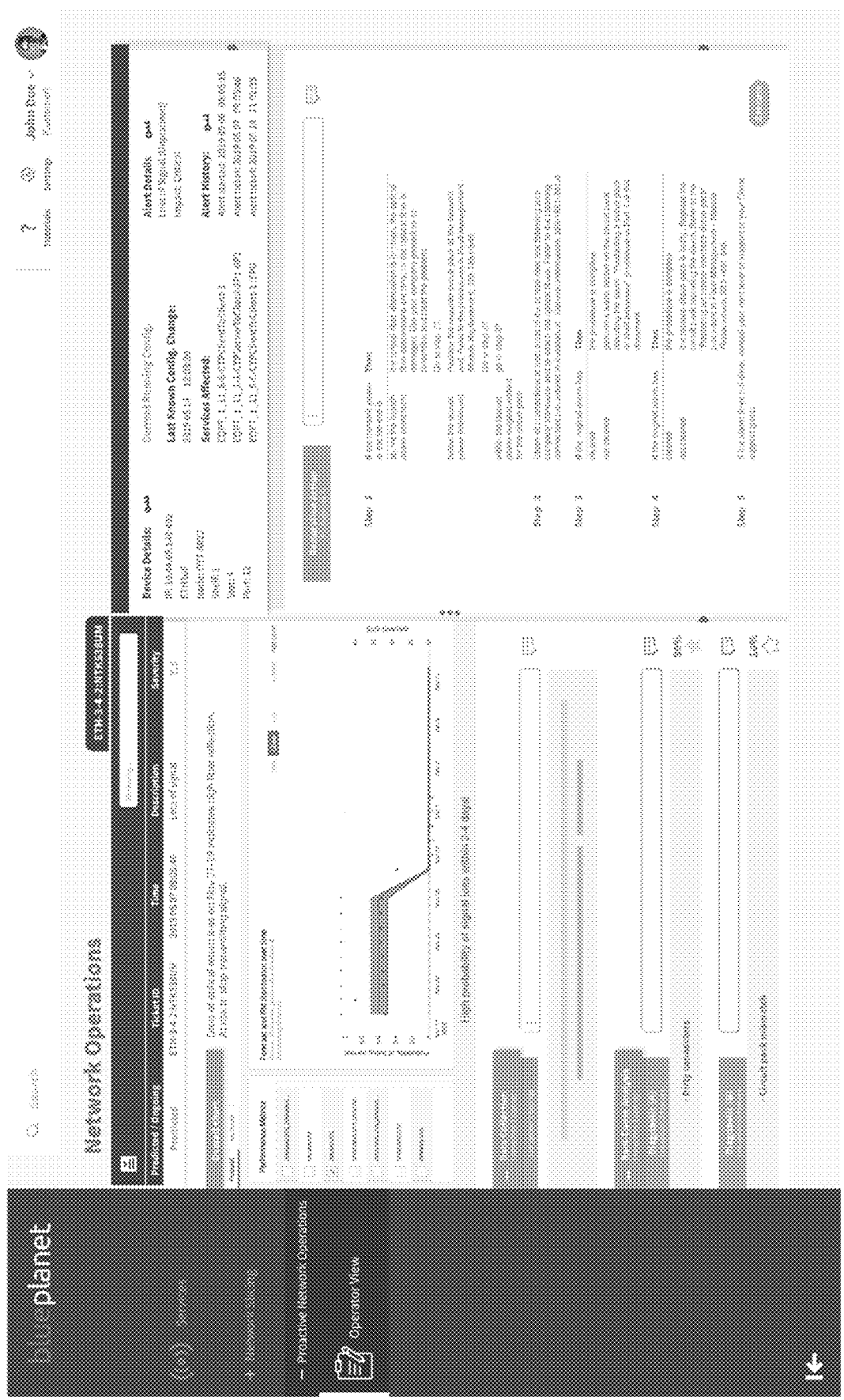
Figure 12:
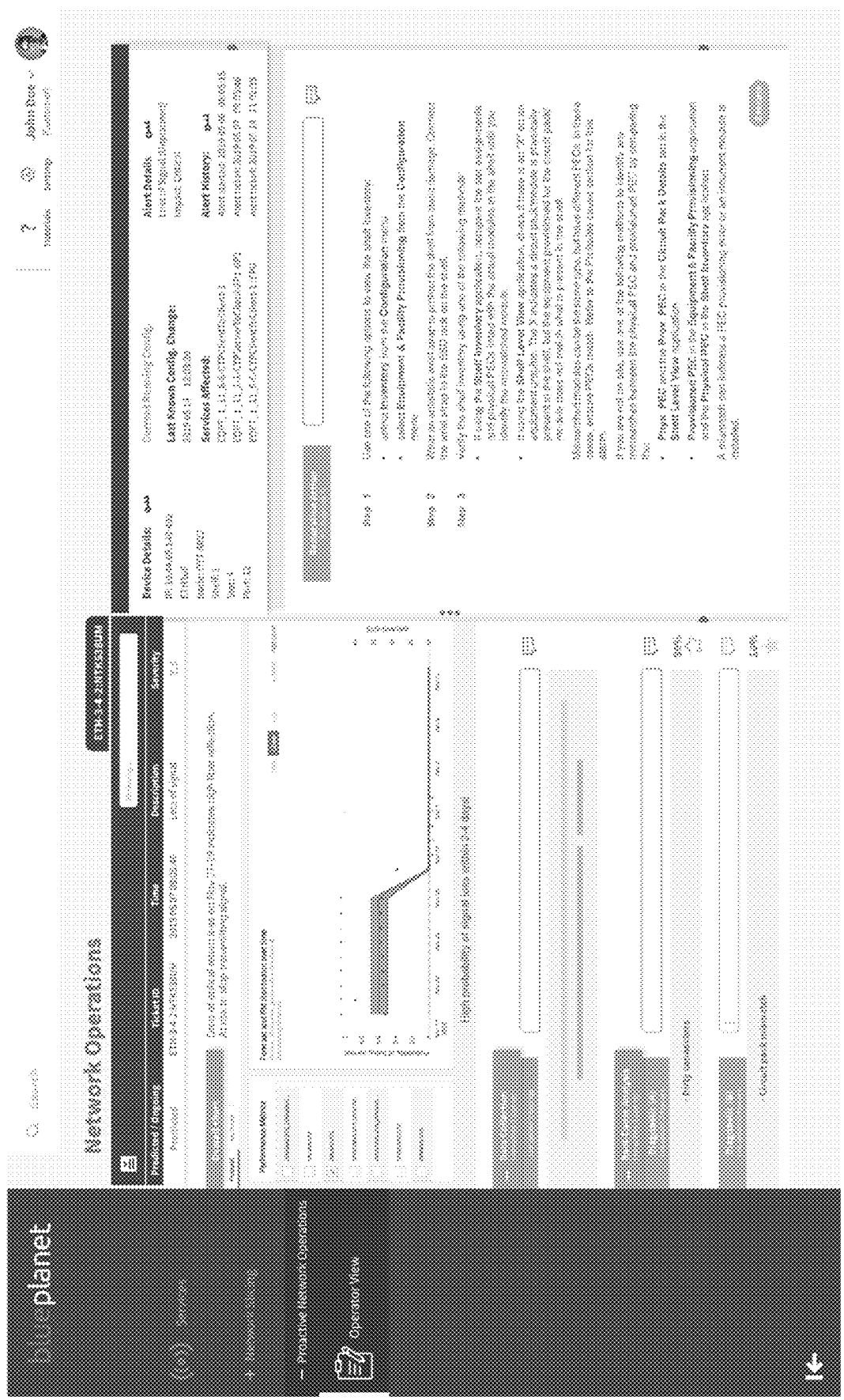

FIG. 11 is a screenshot of the restoration action recommended for the diagnostic (A) of the predicted issue. This also includes step-by-step actions in detail for an operator to troubleshoot to resolve the predicted issue. Of note, these prescriptive actions can be performed prior to an actual, ongoing issue. For the potential loss of signal, the steps include checking transmit power and performing actions and cleaning the connectors. If this does not correct the problem, the prescriptive actions move to further actions such as restarting circuit packs, correcting circuit packs, etc. FIG. 12 is a screenshot of the restoration action recommended for the diagnostic (B) of the predicted issue. This also includes step-by-step actions to address the potential circuit pack mismatch.

The prescriptive actions are specific, detailed, and ordered. In this manner, the PNO software application 50 provides expertise to the operator for troubleshooting purposes.

Figure 13:
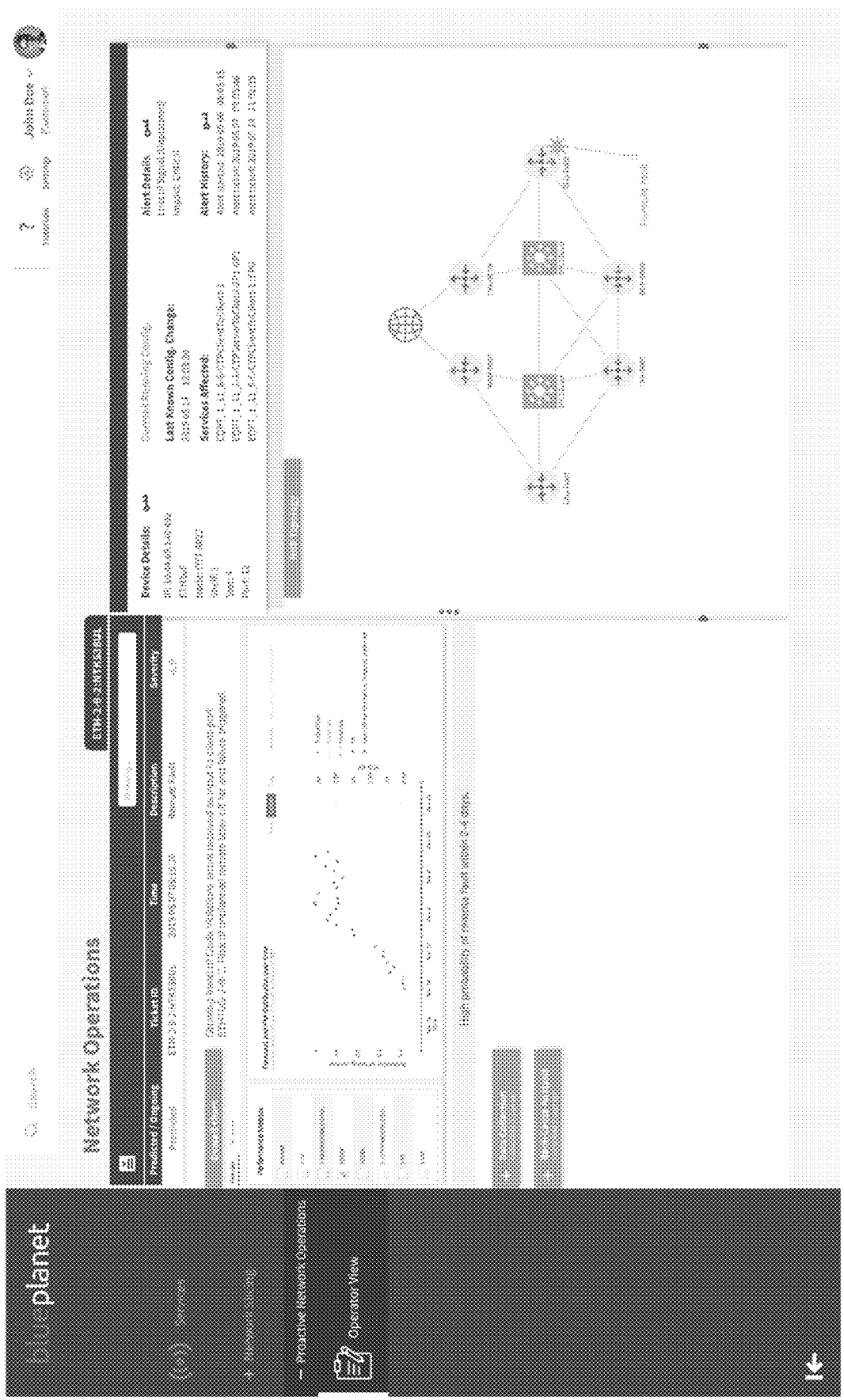
Figure 14:
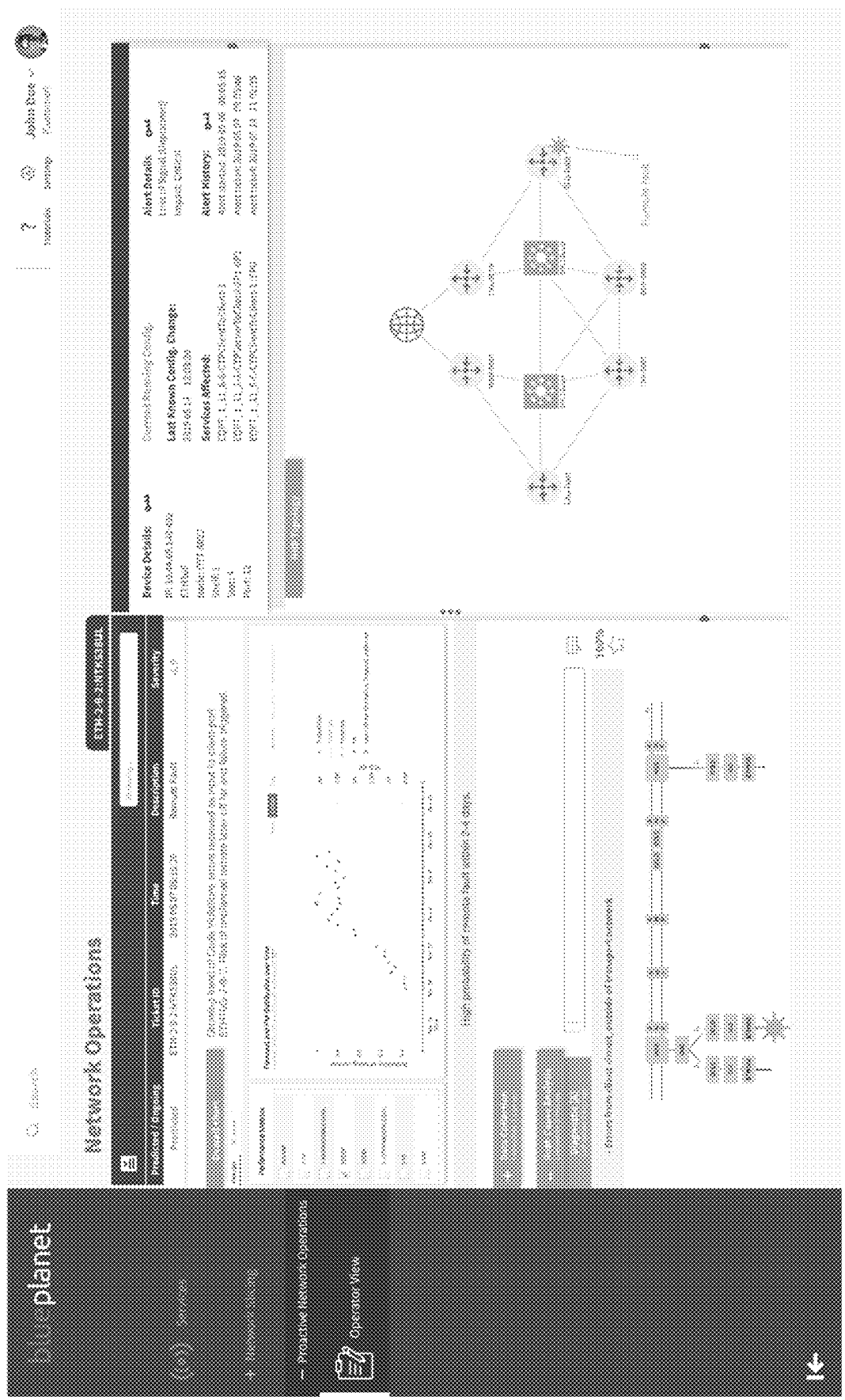
Figure 15:
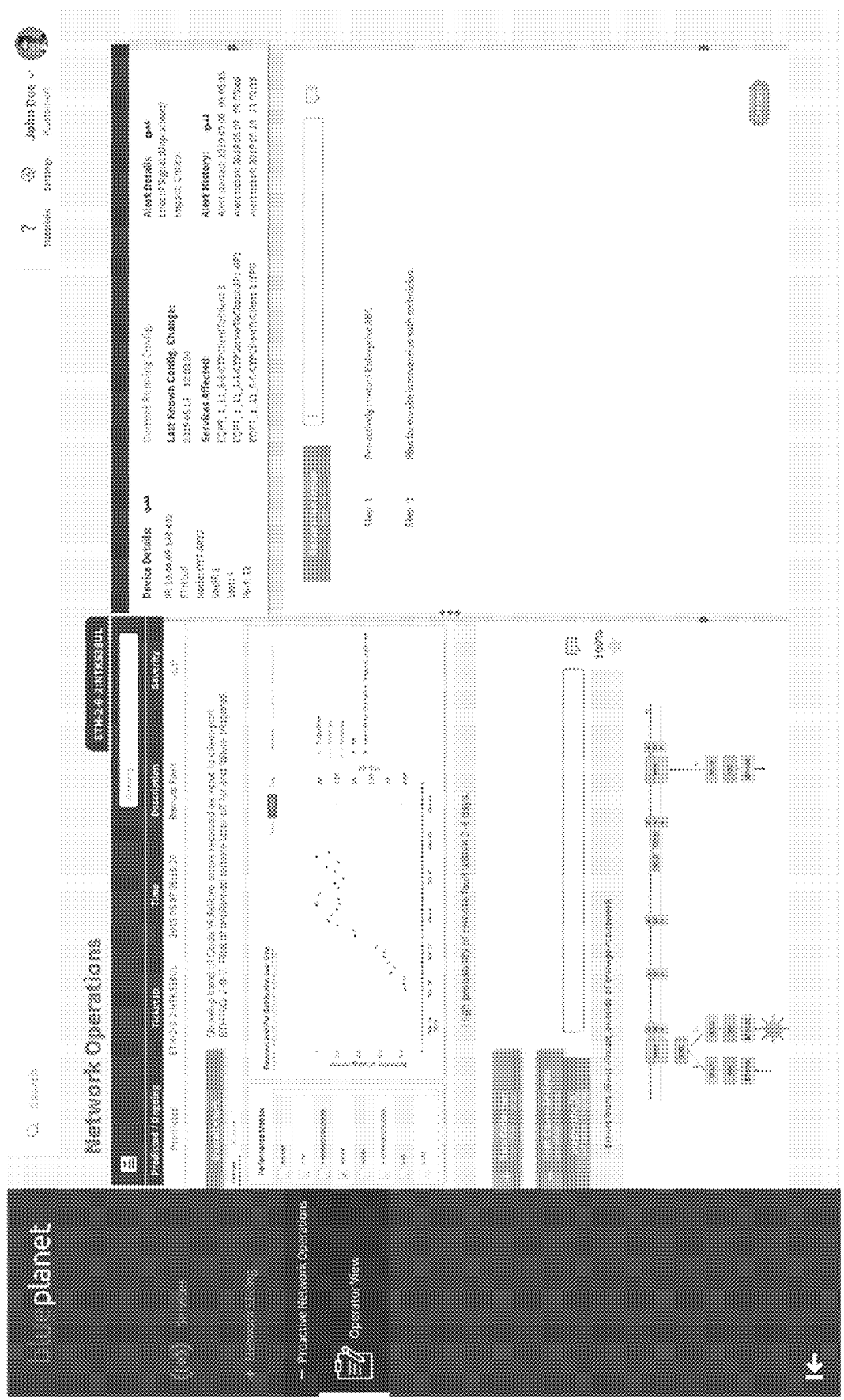

FIG. 13 is a screenshot of the predicted remote fault issue. Here, the user has returned to the list in FIG. 5 and selects the predicted remote fault issue. FIG. 14 is a screenshot of the root cause analysis from FIG. 13. Here, the user selects the root cause analysis. Here, the root cause includes errors from a client circuit, outside of the transport network. FIG. 15 is a screenshot of the restoration action recommended for the diagnostic (A). Here, the user is directed to contact the client.

Figure 16:
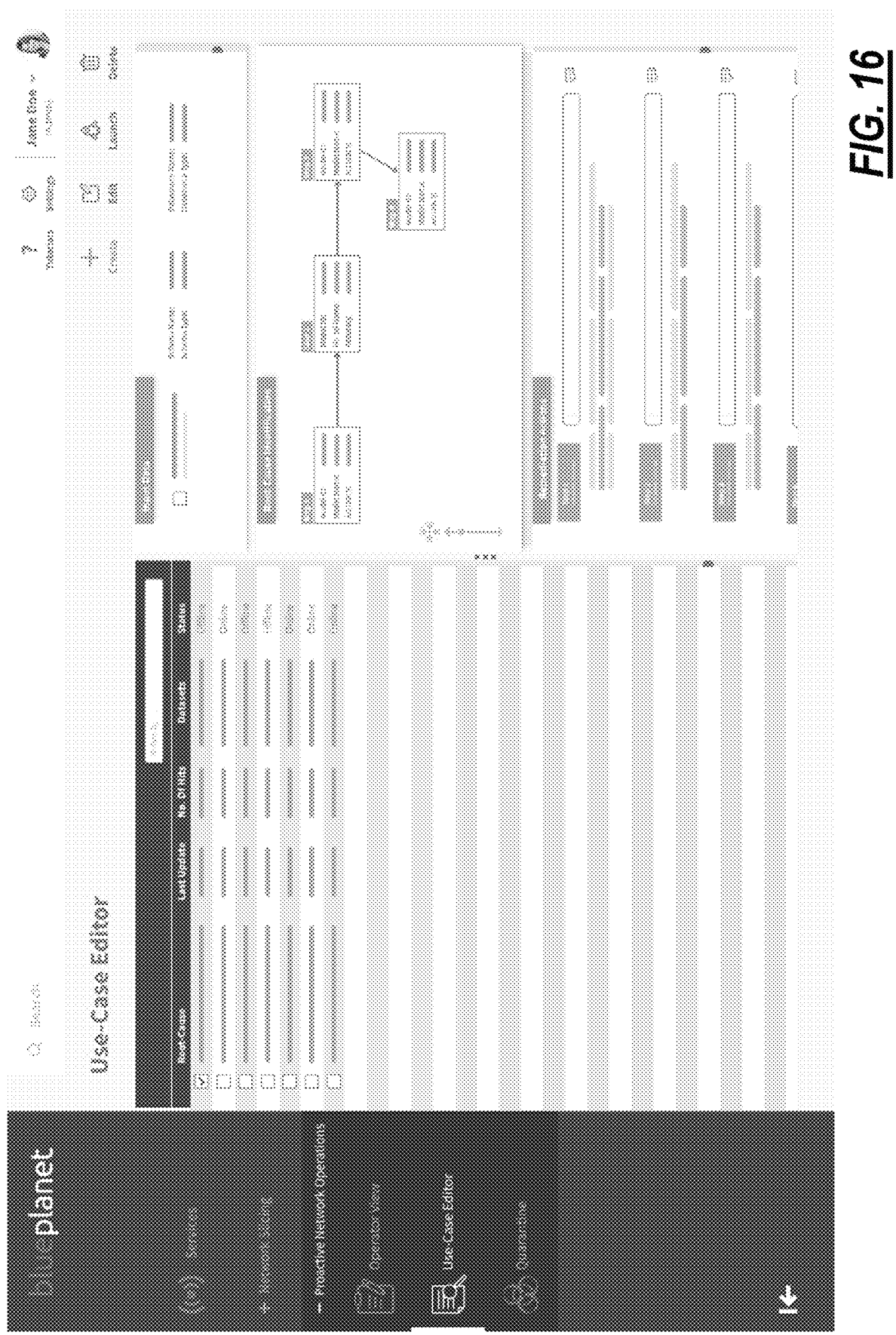

FIG. 16 is a screenshot of a use-case editor user interface, such as via the workflow management module 58. The use-case editor user interface is used to define new issue files, edit existing issue files, address quarantined incidents, etc. The use-case editor user interface includes a root cause list. The root cause list displays a root cause, the last update, the number of hits, etc. Once a specific root cause is selected in the root cause list, the use-case editor user interface displays input data, root cause identification, and remediation actions for the selected root cause. From this use-case editor user interface, an operator can define/edit the various aspects.

PNO Process

Figure 17:
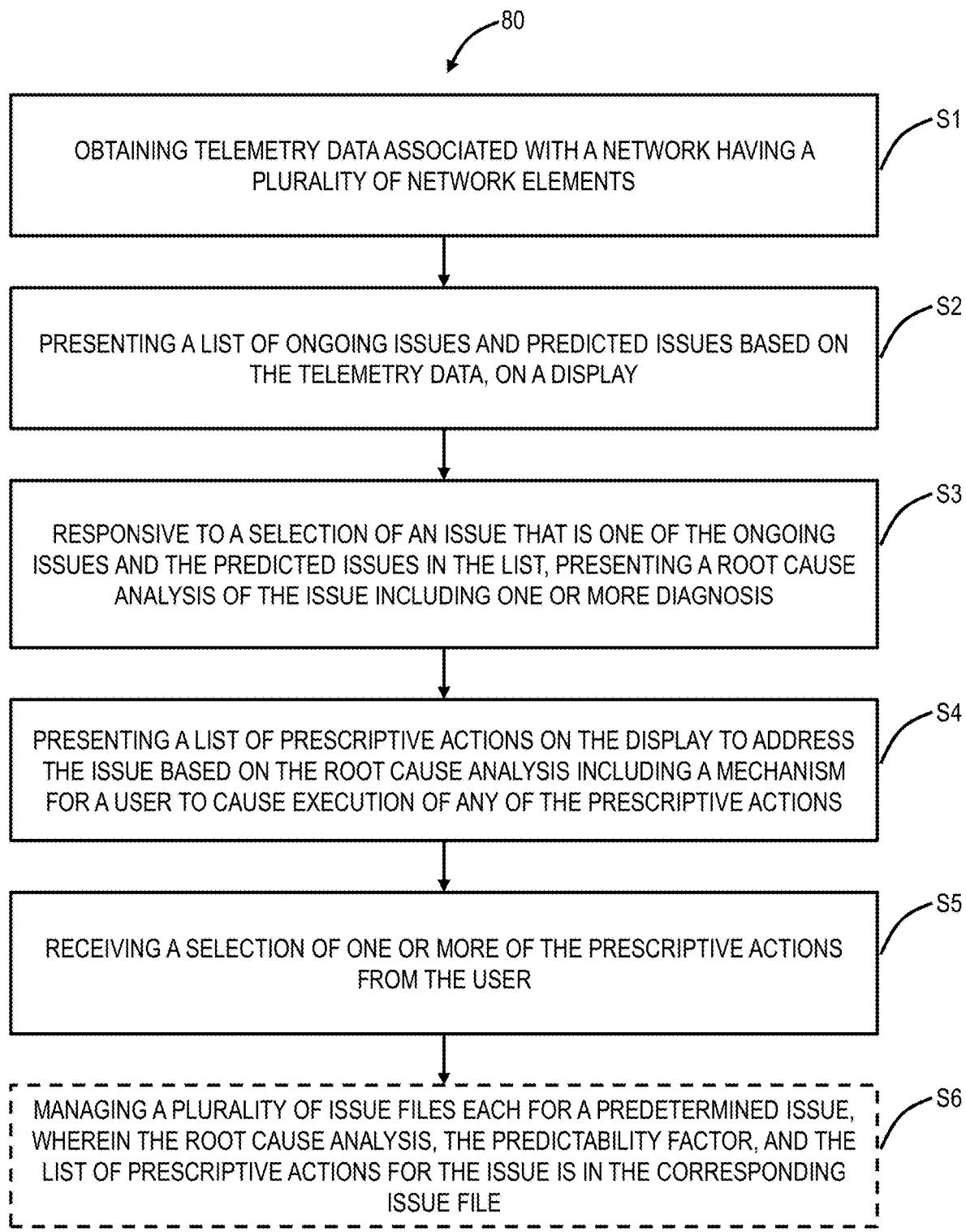
FIG. 17 is a flowchart of a proactive network operations process.

FIG. 17 is a flowchart of a proactive network operations process 80. The proactive network operations process 80 can be implemented on a processing device, include a non-transitory computer-readable medium comprising instructions that, when executed, cause a processor to perform the steps, and be performed as a method. The proactive network operations process 80 includes obtaining telemetry data associated with a network having a plurality of network elements (step S1); presenting a list of ongoing issues and predicted issues based on the telemetry data, on a display (step S2); responsive to a selection of an issue that is one of the ongoing issues and the predicted issues in the list, presenting a root cause analysis of the issue including one or more diagnosis step S3); presenting a list of prescriptive actions on the display to address the issue based on the root cause analysis including a mechanism for a user to cause execution of any of the prescriptive actions (step S4); and receiving a selection of one or more of the prescriptive actions from the user (step S5).

The proactive network operations process 80 can also include presenting a predictability factor of how reliable the root cause analysis is to the issue; and. responsive to the selection of the one or more of the prescriptive actions, updating the predictability factor in the display. The proactive network operations process 80 can include managing a plurality of issue files each for a predetermined issue, wherein the root cause analysis, the predictability factor, and the list of prescriptive actions for the issue is in the corresponding issue file (step S6). The proactive network operations process 80 can include, responsive to feedback on the root cause analysis and the prescriptive actions, updating the one or more diagnosis in the corresponding issue file. The root cause analysis can identify multiple diagnoses, each having a different predictability factor and a different list of prescriptive actions.

The proactive network operations process 80 can include, prior to the obtaining, creating the plurality of issue files utilizing historical data and associated patterns and trends therein. The predictability factor can be below a threshold, and the proactive network operations process 80 can include quarantining the issue for review; and responsive to manual review of the issue, updating the corresponding issue files based on the manual review, to improve the predictability factor. The issue can be a predicted issue, and the proactive network operations process 80 can include creating a new ticket in a ticketing system for the predicted issue. The feedback can include either implicit feedback where the feedback is inferred and explicit feedback. The root cause analysis and the prescriptive actions can be based on machine learning techniques.

Safeguarding Artificial Intelligence (AI)-Based Network Control

The present disclosure also relates to systems and methods for systems and methods for safeguarding Artificial Intelligence (AI)-based network control. The systems and methods can be independent of an AI system (software) and applicable to various different AI system. The systems and methods provide safeguards at various points in a control loop to protect decision making. Variously, the systems and methods include:

An ability to request human confirmation if a decision is ambiguous, if the AI-proposed action can affect mission-critical services, or if the proposed action has legal implications;

An ability to combine deterministic reactions to extreme situations of network behavior combined with the detailed but non-deterministic actions from machine learning AI;

An ability to apply and coordinate rollback changes to previous known stable states subject to policy/operational constraints;

An ability to apply safeguarding for a subset of network/service states, e.g., for a set of services belonging to a given network slice based on premium versus standard classes;

An ability to compartmentalize the application of AI system actions so as to mitigate the impact on other slices/services/resources;

An ability to quarantine offending Machine Learning (ML) models;

An ability to revert to previously stable ML inference models such as with weights, etc.;

An ability to exchange with peer AI systems of other domains in a service/slice context model state such as current ML model parameters (structure, weights, etc.) and valid/stable set of models in order to synchronize. Such peering policy might be enabled via the external safeguarding application.

The safeguards themselves can have "false positive" results in a sense they block something that should have gone through, but this can be improved via learning from human feedback. That is, human feedback for the safeguard can be used to improve the accuracy of ML models.

Risks Associated with AI-Driven Systems

While these types of ML have led to breakthroughs in AI capability such as unbeatable (by humans) chess, Atari, and Go-playing systems, or image recognition systems, there are concerns with using them in real-world deployments. Risks associated with pure data-driven and AI-driven systems include: 1) Non-deterministic behavior AI inference which is statistical in nature, 2) unbounded uncertainty of AI inference that can result in arbitrarily large inaccuracy on rare occasions, even it is very accurate in most cases, 3) unpredictable behavior of AI inference in the presence of input data that is very different than the data in training and testing datasets, and 4) the possibility to break the system by injecting malicious input data.

Figure 18:
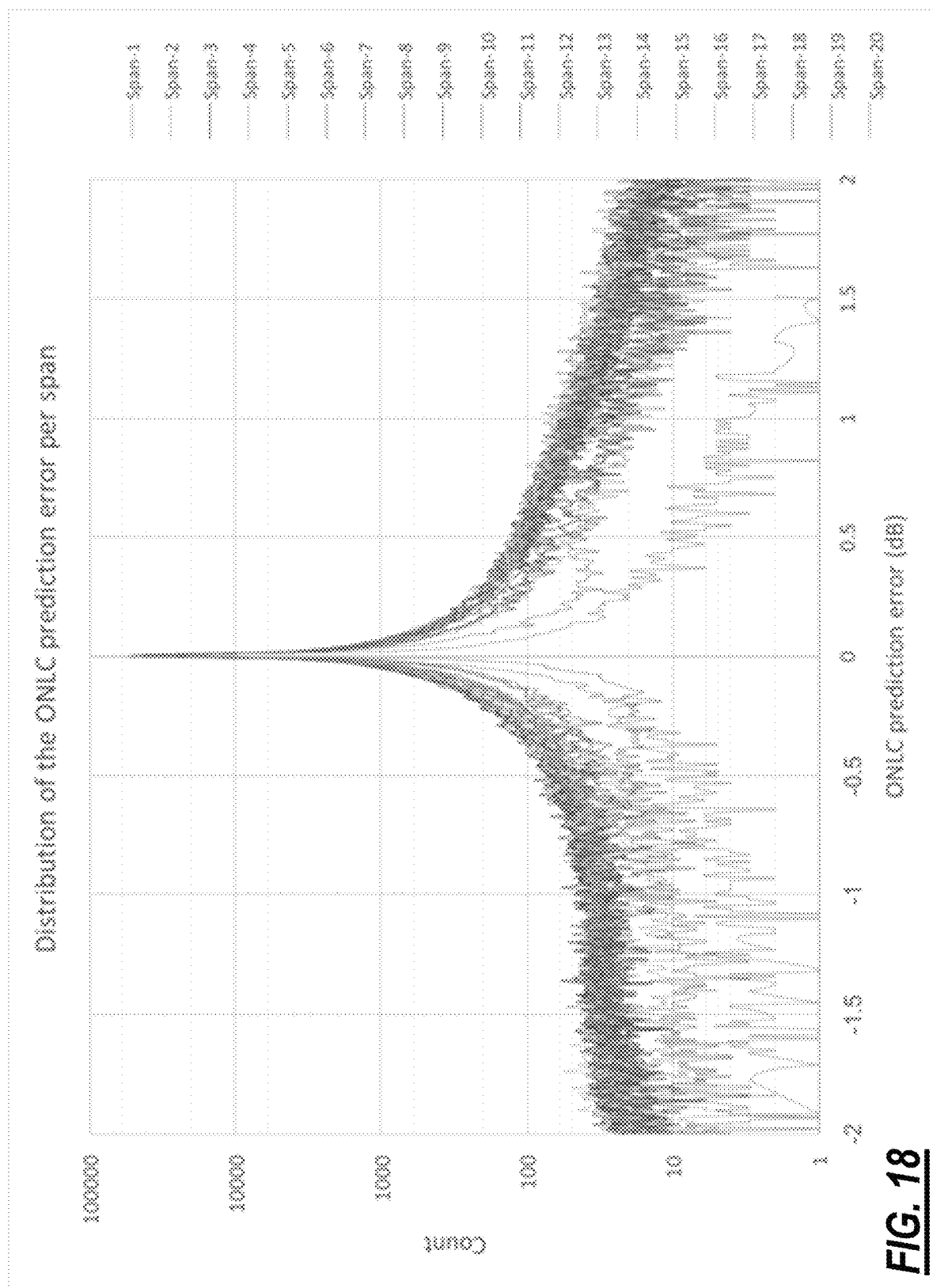
FIG. 18 is a graph of the distribution of Optical Non-Linear Coefficient (ONLC) prediction error per span.

Indeed, statistical ML algorithms typically provide very accurate predictions in the vast majority of situations but tend to have long tails of poor-accuracy in rare situations. For example, FIG. 18 is a graph of the distribution of Optical Non-Linear Coefficient (ONLC) prediction error per span. FIG. 18 shows an example of this behavior, where an ANN determines the value of ONLC with a resolution of less than 0.2 dB for more >99.9% of the cases but produces seemingly unbounded errors on rare cases. This can be problematic especially for, as example, network operator service/network control where an action may result in configuration changes across many network systems of one or more operator (service provider and partner operators) and/or technology (e.g., packet and optical layers) domains that supports the state for a given service. There must be no risk that potential AI mistakes could disrupt mission-critical services. Note, as described herein, network systems can include cloud systems as well including cloud systems with compute and storage resources (in addition to networking resources).

Additional potential issues with AI-driven networks identified include 1) actions may have unintended negative side effects, 2) a reward system may not reflect accurately the desired outcome, 3) training may not sufficiently reflect the costs of actions in the real world, 4) exploratory actions by the system while learning may lead to catastrophic results, 5) policies learned in training may not apply in the real-world environment, etc. As a result, there is a need for controls on the AI system 20 that prevent it from making disastrous decisions or causing the environment to evolve into suboptimal states that the AI system 20 believes are optimal based on its observations and learned behavior.

Safeguard Module

Figure 19:
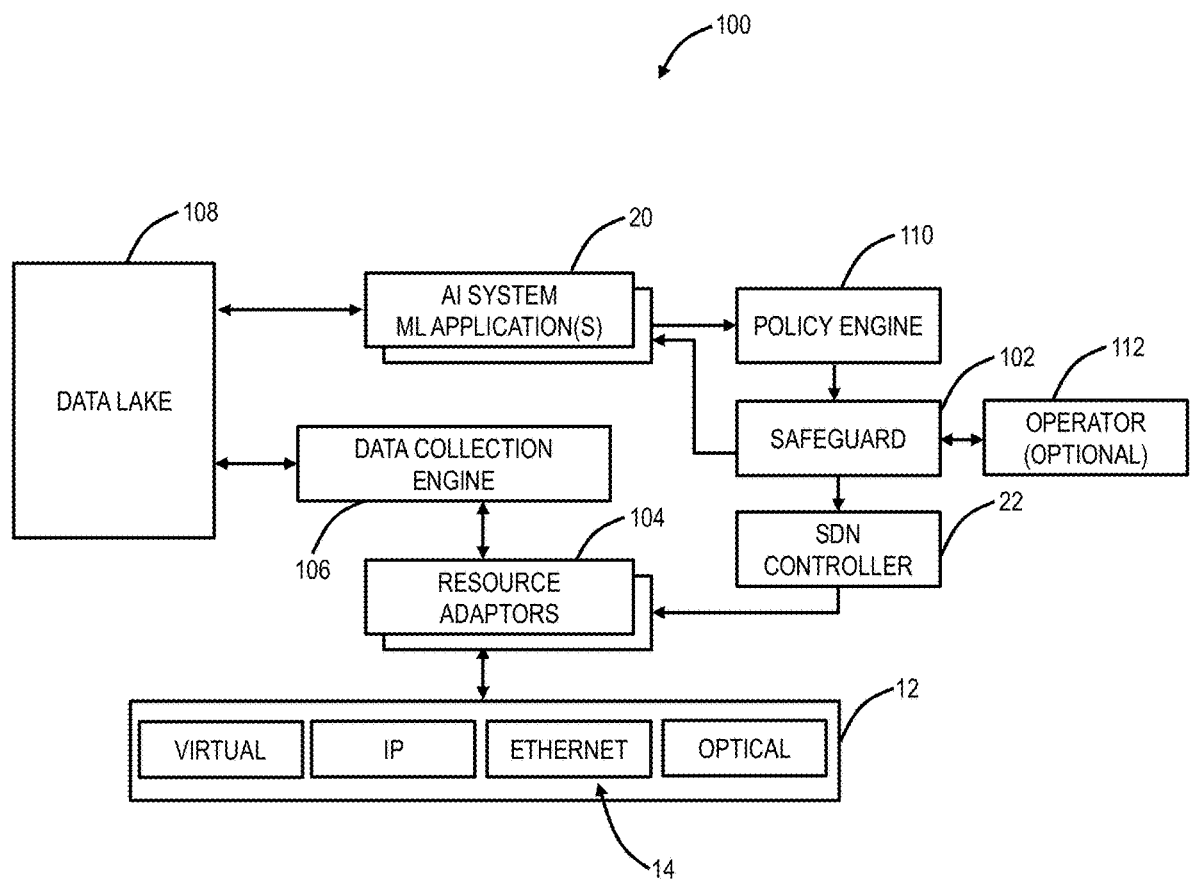
FIG. 19 is a block diagram of an expanded AI-driven system for adaptive control of a network and with a safeguard module.

FIG. 19 is a block diagram of an expanded AI-driven system 100 for adaptive control of a network 12 and with a safeguard module 102. The safeguard module 102 can reset or modify the actions of the AI system 20 if problems are detected with the environment, serving as a safeguard on the AI system 20. The AI-driven system 100 includes the network 12 with the various network elements 14 as well as cloud nodes or virtual private clouds, etc. The network 12 and the network elements 14 (as well as any cloud elements or other types of devices, components, etc.) are connected to Resource Adapters (RA) 104 for communication of telemetry and monitoring data. As described herein, a network element includes any device in a network or cloud that enables networking, compute, and/or storage resources. A data collection engine 106 is configured to process, consolidate, and store the telemetry and monitoring data from various different types of network elements 14 in a data lake 108.

The AI system 20 which can be one or more ML applications can utilize the data in the data lake 108 for automated control of the network 12, in conjunction with a policy engine 110. The safeguard module 102 is connected to the AI system 20, between the AI system 20 and the controller 22. Optionally, an operator 112 (human) can interface with the safeguard module 102. The controller 22, such as an SDN controller, is connected to the RA 104 for communication to the network elements 14. Advantageously, the AI-driven system 100 leverages accurate ML insights for 99.9% of situations but includes a deterministic safeguard module 102 to guarantee that ML accuracy remains bounded.

In an example operation, the safeguard module 102 takes inputs from a single ML algorithm implemented by the AI system 20. Here, the safeguard module 102 can look at the statistical uncertainties reported by the ML algorithm itself to flag ambiguous insights. For instance, if a classification is performed by an ANN whose last layer is Softmax, the safeguard module 102 can require that one category is clearly more probable than all the others and/or it can require a high probability threshold in order to validate a given insight. Optionally, the safeguard module 102 can request human confirmation from the operator 112 if a decision is ambiguous, e.g., if the AI-proposed action can affect mission-critical services or if the proposed action has legal implications.

Figure 20:
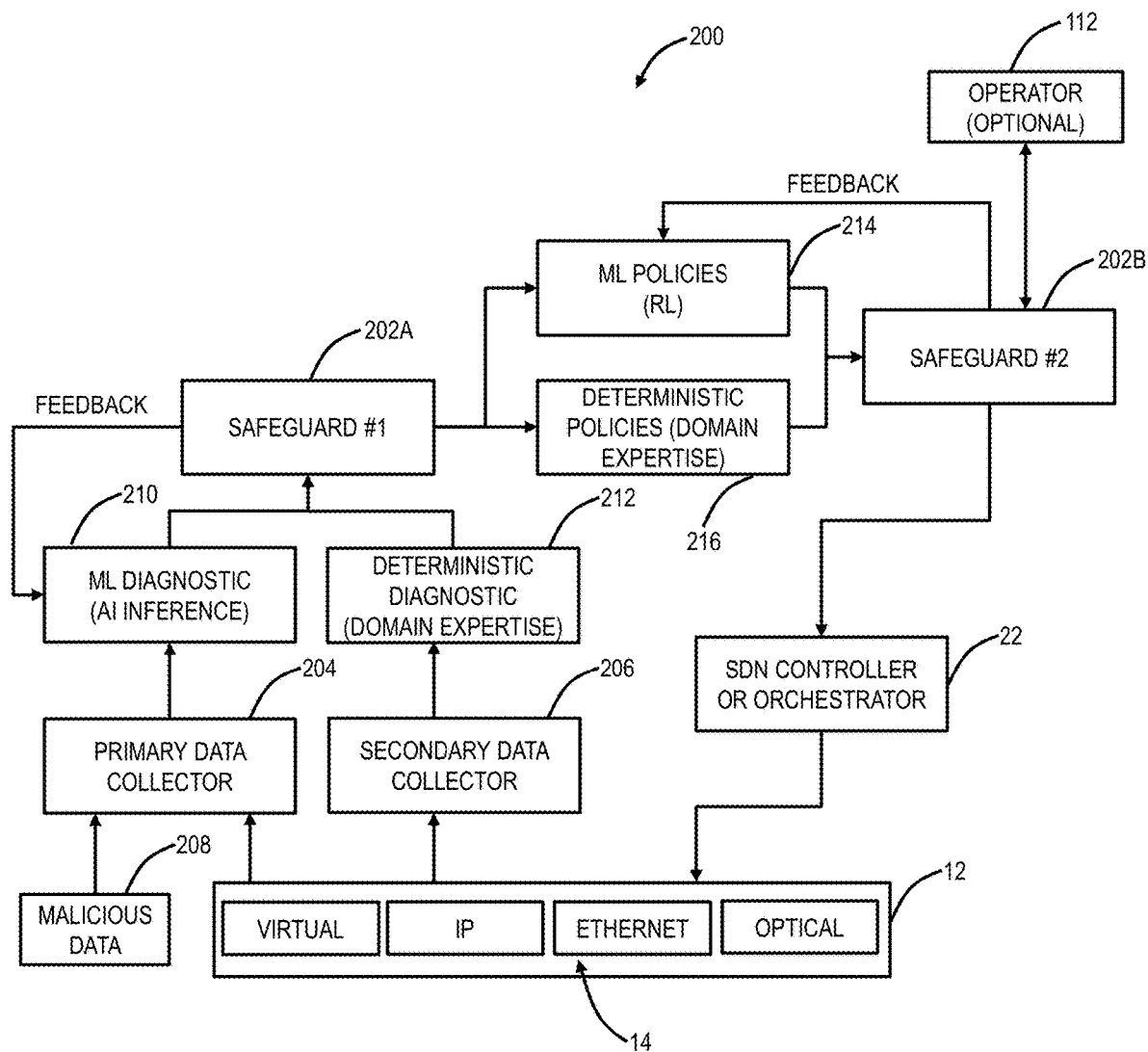
FIG. 20 is a block diagram of another expanded AI-driven system for adaptive control of a network and with multiple safeguard modules.

FIG. 20 is a block diagram of an expanded AI-driven system 200 for adaptive control of a network 12 and with multiple safeguard modules 202A, 202B. The AI-driven system 200 includes the network 12 with the various network elements 14. The network 12 and the network elements 14 are connected to data collectors 204, 206 for communication of telemetry and monitoring data. The data collectors can include a primary data collector 204 and a secondary data collector 206. Each data collector 204, 206 can be configured, similar to the RA 104, to communicate with the network elements 14. Also, it is possible for one of the data collectors 204, 206 to obtain malicious data 208.

In an embodiment, the primary data collector 204 can provide input to an ML diagnostic 210 (AI inference) module and the secondary data collector 206 can provide input to a deterministic diagnostic 212 (domain expertise) module. In the AI-driven system 200, there are several safeguard modules 202A, 202B. The safeguard module 202A can be for diagnostics about what is happening in the network 12, and the safeguard module 202B can be for actions that may be taken on the network 12. That is, the safeguard module 202A can maintain the integrity of the input to the AI system, and the safeguard module 202B can maintain the integrity of the actions of the AI system. The closed-loop automation system can protect itself from malicious fake-data attacks by using multiple independent data collectors 204, 206 and data sources. The safeguard module 202A can be after the diagnostics 210, 212, and before an ML policies 214 (RL) module and a deterministic policies 216 (domain expertise) module. The safeguard module 202B can be between the policies 214, 216, and the controller 22 which implements the actions in the network 12.

In this embodiment, each of the safeguard modules 202A, 202B takes inputs from at least two independent sources with no constraints on the number of inputs that could be used in a given implementation. For example, one input could be the current network state from the SDN controller 22 at the time (t+Δ) while the ML inference engine decided on the network state at the time (t) or earlier. The safeguard module 202A, 202B can request that all or a certain subset of input algorithms agree about insight to validate it and discard insights that do not get consensus. For example, a safeguard module 202 may consider an "aggressive" algorithm based on AI inference and a "conservative" algorithm based on deterministic domain expertise. Note, the various embodiments can include a single safeguard module 102, 202B as in FIGS. 4-5 or both safeguard modules 202A, 202B as in FIG. 5.

Figure 21:
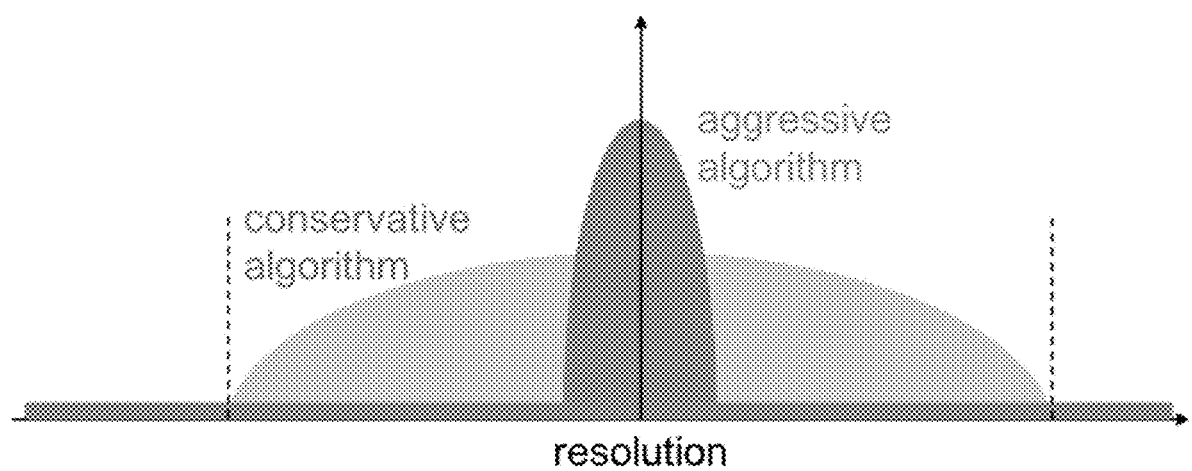
FIG. 21 is a graph of results between an "aggressive" algorithm based on AI inference and a "conservative" algorithm based on deterministic domain expertise.

FIG. 21 is a graph of results between an "aggressive" algorithm based on AI inference and a "conservative" algorithm based on deterministic domain expertise. As shown on FIG. 6, the aggressive algorithm (e.g., AI inference) generally produces most-accurate results but has unbounded uncertainties, while a conservative algorithm (e.g., deterministic subject-matter expertise) is generally less accurate but defines a bounded uncertainty. Specifically, the aggressive algorithm is the result of AI/ML, whereas the conservative algorithm is the result of human expertise. The safeguard module 102, 202 can leverage the best of both worlds by using the aggressive results protected by the conservative uncertainty. Some examples are given in Table 1.

TABLE 1 examples of Safeguard outputs from two independent inputs.

| Task | Aggressive input (AI inference) | Conservative input (deterministic subject-matter) | Safeguard output |
|---|---|---|---|
| Classification | Event has type B | Event has type B, C or D | type B |
|  | Event has type A | Event has type B, C or D | None |
| Measurement | 12 +/− 0.1 dB | 15 +/− 4 dB | 12 dB |
|  | 4 +/− 0.1 dB | 15 +/− 4 dB | None |

In Table 1, the conservative algorithm is used by the safeguard module 102, 202 to bound the AI inference. In FIG. 6, as long as the AI inference result is within the deterministic subject-matter result, the safeguard module 102, 202 allows such a result. Otherwise, it is blocked as being an unbounded result. Alternatively, the AI inference result can be modified if there is overlap between the deterministic subject-matter result and the AI inference result, such as in the first example in Table 1.

The different components can be implemented as part of a network slice or a network domain. Additionally, implementations could use additional Virtual Machines (VMs)/Containers as part of the service chain of functions to host the ML inference engine and safeguard module(s) for closed loop behaviors. Alternatively, an implementation can be as a safeguard-as-a-service with the ML inference engine and safeguard module(s) hosted in a private/public cloud. Various configurations and implementations are contemplated. Finally, it is possible to configure a safeguard module 102, 202 in passthrough mode to effectively disable its effect.

Figure 22:
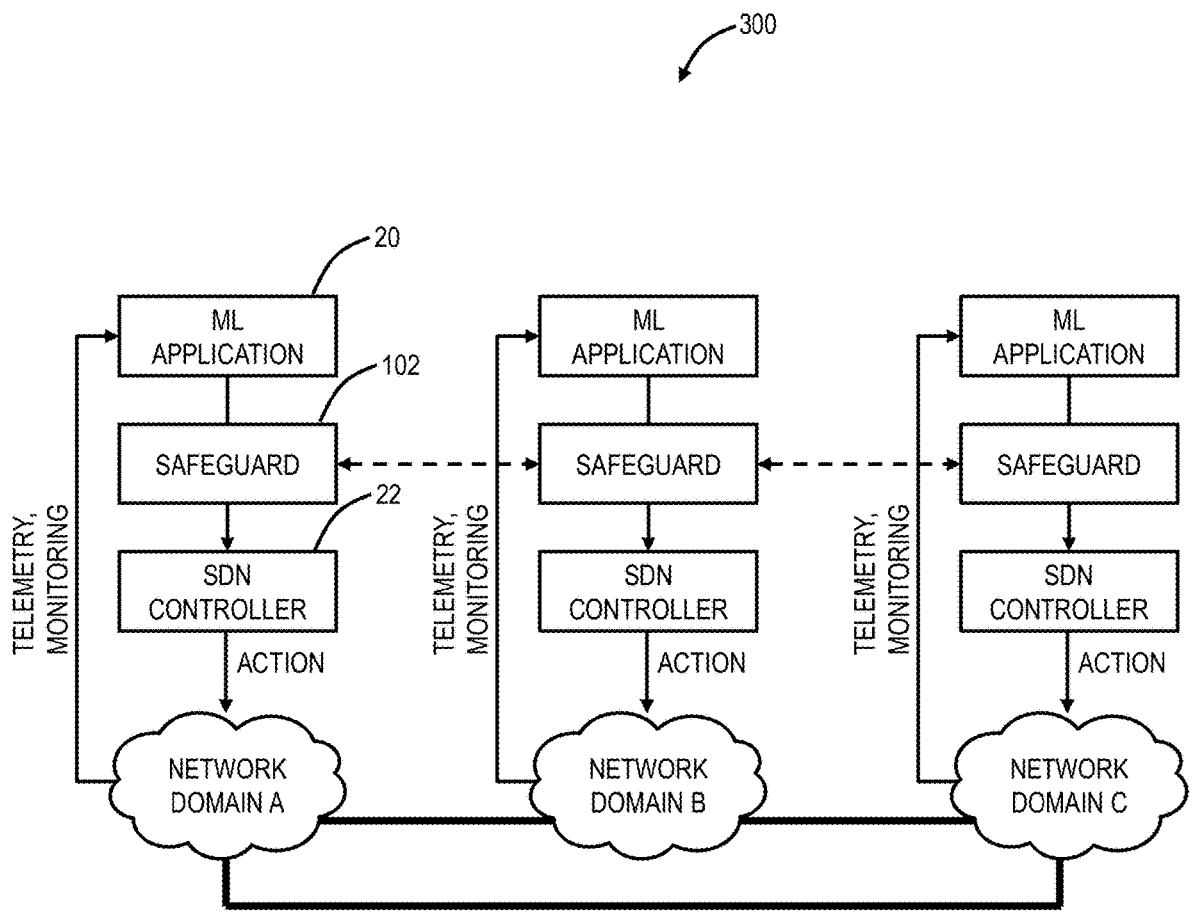
FIG. 22 is a block diagram of multi-domain use of a safeguard system.

FIG. 22 is a block diagram of multi-domain use of a safeguard system 300. When a safeguard client application is separate from the AI, it can be monitoring/safeguarding a single or may coordinate monitoring of a cluster of AI system instances that may be in one or multiple operator and technology domains. The safeguard system 300 includes the safeguard module 102 between an AI system 20 (ML application) and controller 22 which is connected to a network domain. Here, the safeguard module 102 can be implemented as a safeguard client application.

The safeguard client application may be using the same information about the environment or it may have access to additional information, for example, having a more global, shared view where a given AI system 20 instance might be focused on a particular domain within the global environment. Such a safeguard client application can also be a customer instance for a network slice that an AI system might be responsible for. This could allow a customer to monitor/safeguard the AI system, including updating ML models in the network slice and coordinate AI Safety as needed.

Artificial Intelligence (AI)-Based Network Control System and Process

In an embodiment, an Artificial Intelligence (AI)-based network control system includes an AI system 20 configured to obtain data from a network 12 having a plurality of network elements 14 and to determine actions for network control through one or more Machine Learning (ML) algorithms; a controller 22 configured to cause the actions in the network 12; and a safeguard module 102, 202 between the AI system 20 and the controller 22, wherein the safeguard module 102, 104 is configured to one of allow, block, and modify the actions from the AI system 20 to ensure accuracy of the AI system 20 remains bounded. For example, the AI system 20 remains bounded when the results (actions) overlap results from the conservative or deterministic approach (FIG. 6).

Thus, the AI-based network control system includes an AI safeguard system with deterministic behavior to supervise and modify the behavior of the AI system 20 which could use Reinforced Learning or some other ML algorithm. The safeguard module 102, 202 can be further configured to obtain its own view of the network 12 independent from the AI system 20 and develop deterministic decisions which are used to compare with the actions from the ML algorithms. The safeguard module 102, 202 forms its own view of the state of the environment based on telemetry, alarms and other monitoring information it receives. It makes deterministic decisions based on this information to modify the future actions of the AI system 20.

Note, the safeguard module 102, 202 does not provide parallel functionality to the AI system 20 itself; it does not determine what network state should be transitioned to from a given state and input or try to optimize use of network resources, but only guards against adverse conditions developing in the network 12 based on predetermined rules and thresholds.

The safeguard module 102, 202 may, in fact, reduce the optimality that could be achieved by the AI system 20 without safeguards, however, in return, the network 12 is guaranteed to avoid certain conditions viewed as being catastrophic or extremely negative by the operator. Despite the potential for "false positive" alerts from the safeguard module 102, 202, the network operator may still prefer that the network 12 operate at less than optimum efficiency if the potential for major failure is reduced or eliminated.

The safeguard module 102, 202 includes an observer function that subscribes to receipt of network telemetry, alarms and monitoring as input to a deterministic algorithm in order to determine if an action from the AI system 20 exceeds safeguard thresholds, as well as a gating function that can intercept and either modify or drop action requests from the AI system 20 before they go out to network elements, request human intervention and if supported by the AI system can introduce more global changes to the AI system 20 state and reward functions.

The safeguard module 102, 202 can be configured to allow the actions if the actions are within the deterministic decisions, block the actions if the actions are not within the deterministic decisions, and modify the actions based on overlap with the deterministic decisions. The safeguard module 102, 202 can be further configured to obtain operator input before the one of allow, block, and modify the actions, and wherein the operator input is provided to the ML algorithms for feedback therein.

The safeguard module 102, 202 can be further configured to compare the actions from the AI system 20 to a result from a deterministic algorithm to ensure the actions do not exceed limitations. For example, the safeguard module 102, 202 can prevent network-affecting failures (e.g., loss of critical connectivity, overall congestion) and causing load on particular network elements 14 or sets of network elements 14 to exceed desired values. The safeguard module 102, 202 can be further configured to determine the actions from the AI system 20 do not violate predetermined conditions, e.g., disruption of known critical connectivity, The safeguard module 102, 202 can be further configured to interact with a second safeguard module associated with another network. In this interaction, the safeguard module 102, 202 can determine the AI system 20 requested action for one domain will introduce issues in a neighboring or remote domain and protect. The safeguard module 102, 202 may monitor a single or multiple AI systems 20 at the same time. It may have information available to it that is more global in nature than the information used by any single AI system 20. Optionally, the safeguard module 102, 202 is independent from the AI system.

The safeguard module 102, 202 may impact the future actions of the AI system 20 in a number of ways, for example:

forcing the AI system 20 to stop acting, and possibly causing a deterministic algorithm to be used instead;

causing the AI system 20 to roll back to an earlier state;

causing the AI system 20 to modify its selection for a learning model, for example, using a more stability-oriented or conservative reward function;

causing the AI system to revert to a pre-defined set of inference models (pruned as needed from its learning model); etc.

However, the safeguard module 102, 202 has advantages including the safeguard module 102, 202 can be independent of the AI system 20 and can be applied to many different AI systems 20 from different developments. The safeguard module 102, 202 does not need to be changed when the AI system 20 is replaced or upgraded. The safeguard module 102, 202 is designed at the start to deal with the global environment and does not need to be trained on a smaller scale environment. The safeguard module 102, 202 does not need to be as complex or sophisticated as the AI system 20, which focuses on the best optimization of network resources.

Figure 23:
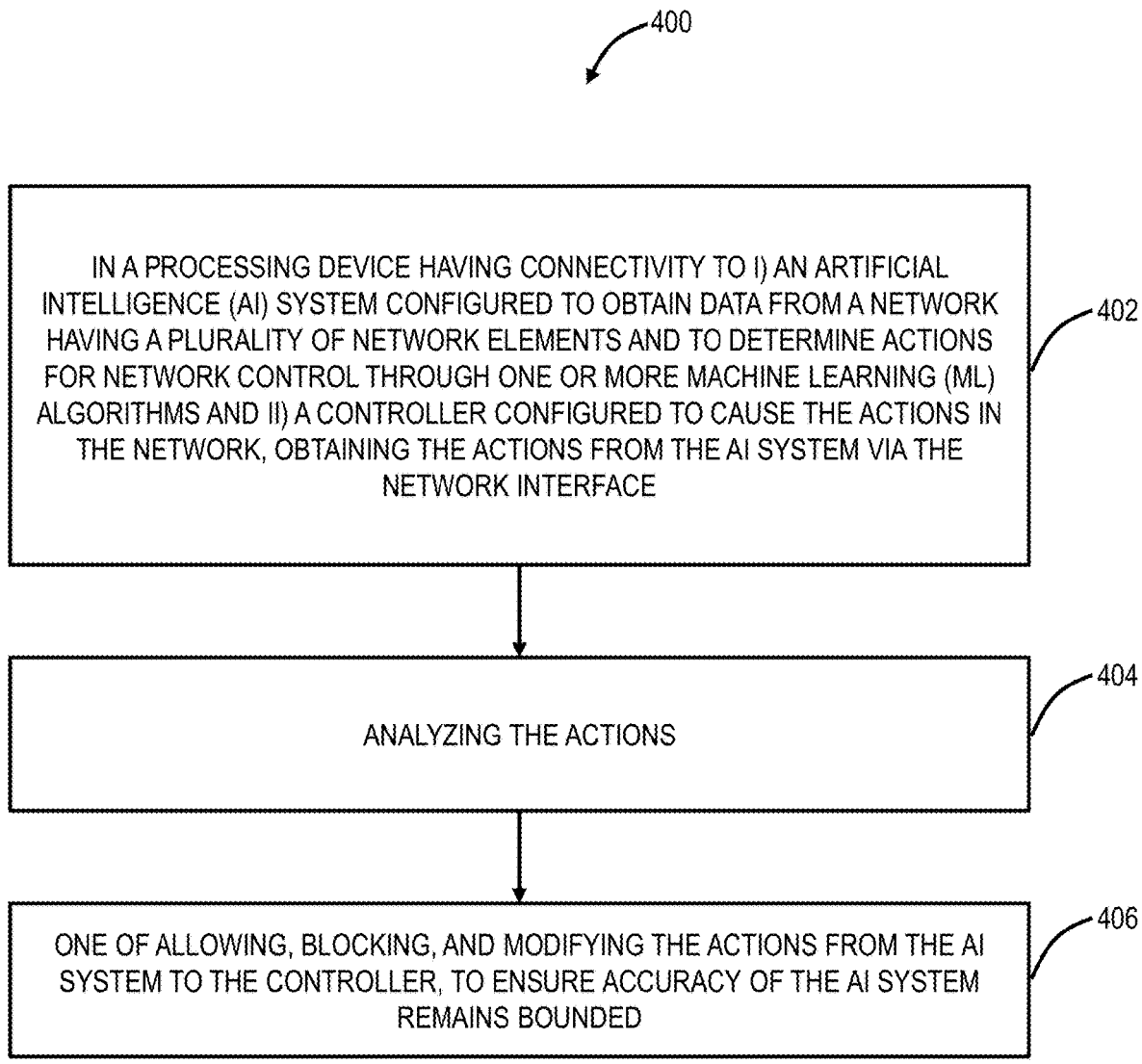
FIG. 23 is a flowchart of a process for AI-based network control.

FIG. 23 is a flowchart of a process 400 for AI-based network control. The process 400 includes, in a processing device having connectivity to i) an Artificial Intelligence (AI) system configured to obtain data from a network having a plurality of network elements and to determine actions for network control through one or more Machine Learning (ML) algorithms and ii) a controller configured to cause the actions in the network, obtaining the actions from the AI system via the network interface (step 402); analyzing the actions (step 404); and one of allowing, blocking, and modifying the actions from the AI system to the controller, to ensure accuracy of the AI system remains bounded (step 406).

The process 400 can further include obtaining a view of the network independent from the AI system; and developing deterministic decisions which are used to compare with the actions from the ML algorithms. The process 400 can further include allowing the actions if the actions are within the deterministic decisions; blocking the actions if the actions are not within the deterministic decisions; and modifying the actions based on overlap with the deterministic decisions. The process 400 can further include obtaining operator input before the one of allow, block, and modify the actions; and providing the operator input to the ML algorithms for feedback therein.

Processing Device

Figure 24:
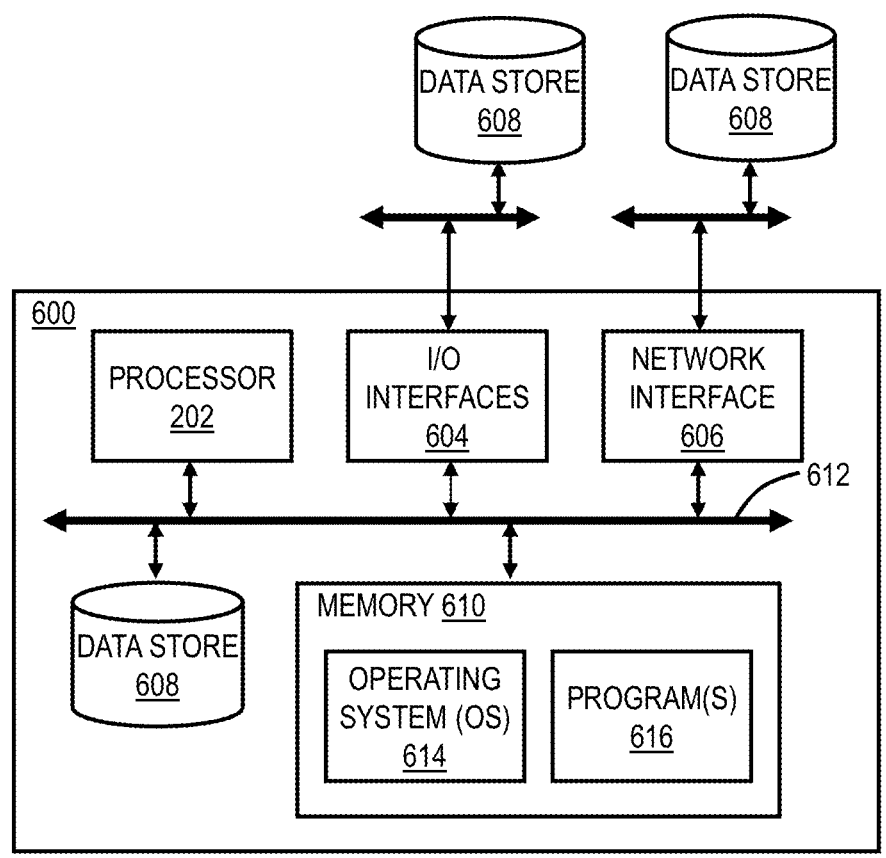
FIG. 24 is a block diagram of a processing device which may be used for realizing various components described herein.

FIG. 24 is a block diagram of a processing device 600 which may be used for various components described herein. For example, the AI system 20, the controller 22, the safeguard module 102, 202, etc. contemplate implementation through one or more processing devices 600. The processing device 600 may be a digital computer that, in terms of hardware architecture, generally includes a processor 602, input/output (I/O) interfaces 604, a network interface 606, a data store 608, and memory 610. It should be appreciated by those of ordinary skill in the art that FIG. 24 depicts the processing device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 may be, for example, but not limited to, one or more buses or other wired or wireless connections, as is known in the art. The local interface 612 may have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 may be any custom made or commercially available processor, a central processing unit (CPU), an auxiliary processor among several processors associated with the processing device 600, a semiconductor-based microprocessor (in the form of a microchip or chip set), or generally any device for executing software instructions. When the processing device 600 is in operation, the processor 602 is configured to execute software stored within the memory 610, to communicate data to and from the memory 610, and to generally control operations of the processing device 600 pursuant to the software instructions. The I/O interfaces 604 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 606 may be used to enable the processing device 600 to communicate on a network, such as to network elements, NMSs, SDN controllers, to various devices described herein, etc. The network interface 606 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 606 may include address, control, and/or data connections to enable appropriate communications on the network. A data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media. In one example, the data store 608 may be located internal to the processing device 600 such as, for example, an internal hard drive connected to the local interface 612 in the processing device 600. Additionally, in another embodiment, the data store 608 may be located external to the processing device 600 such as, for example, an external hard drive connected to the I/O interfaces 204 (e.g., SCSI or USB connection). In a further embodiment, the data store 608 may be connected to the processing device 600 through a network, such as, for example, a network attached file server.

The memory 610 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 may incorporate electronic, magnetic, optical, and/or other types of storage media. Note that the memory 610 may have a distributed architecture, where various components are situated remotely from one another but can be accessed by the processor 602. The software in memory 610 may include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

In an embodiment, the network interface 606 can be communicatively coupled to i) an AI system configured to obtain data from a network having a plurality of network elements and to determine actions for network control through one or more Machine Learning (ML) algorithms and ii) a controller configured to cause the actions in the network 12. The memory storing instructions that, when executed, cause the processor to obtain the actions from the AI system via the network interface, analyze the actions, and one of allow, block, and modify the actions from the AI system to the controller, to ensure accuracy of the AI system remains bounded.

In an embodiment, an Artificial Intelligence (AI)-based network control system includes an AI system configured to obtain data from a network having a plurality of network elements and to determine actions for network control through one or more Machine Learning (ML) algorithms; a controller configured to cause the actions in the network; and a safeguard module between the AI system and the controller, wherein the safeguard module is configured to one of allow, block, and modify the actions from the AI system. The safeguard module can be further configured to obtain its own view of the network independent from the AI system and develop deterministic decisions which are used to compare with the actions from the ML algorithms. The safeguard module can be configured to allow the actions if the actions are within the deterministic decisions, block the actions if the actions are not within the deterministic decisions, and modify the actions based on overlap with the deterministic decisions. The safeguard module can be further configured to obtain operator input before the one of allow, block, and modify the actions, and wherein the operator input is provided to the ML algorithms for feedback therein. The safeguard module can be further configured to compare the actions from the AI system to a result from a deterministic algorithm. The safeguard module can be further configured to determine that the actions from the AI system do not violate predetermined conditions. The safeguard module can be further configured to interact with a second safeguard module associated with another network. The safeguard module can operate independent from the AI system.

In a further embodiment, an apparatus configured to safeguard an Artificial Intelligence (AI)-based control system includes a network interface communicatively coupled to i) an AI system configured to obtain data from a network having a plurality of network elements and to determine actions for network control through one or more Machine Learning (ML) algorithms and ii) a controller configured to cause the actions in the network; a processor communicatively coupled to the network interface; and memory storing instructions that, when executed, cause the processor to obtain the actions from the AI system via the network interface, analyze the actions, and one of allow, block, and modify the actions from the AI system to the controller. The memory storing instructions that, when executed, can further cause the processor to obtain a view of the network independent from the AI system, and develop deterministic decisions which are used to compare with the actions from the ML algorithms. The memory storing instructions that, when executed, can further cause the processor to allow the actions if the actions are within the deterministic decisions, block the actions if the actions are not within the deterministic decisions, and modify the actions based on overlap with the deterministic decisions. The memory storing instructions that, when executed, can further cause the processor to obtain operator input before the one of allow, block, and modify the actions, and provide the operator input to the ML algorithms for feedback therein. The memory storing instructions that, when executed, can further cause the processor to compare the actions from the AI system to a result from a deterministic algorithm. The memory storing instructions that, when executed, can further cause the processor to determine that the actions from the AI system do not violate predetermined conditions. The memory storing instructions that, when executed, can further cause the processor to interact with a second safeguard module associated with another network. The safeguard module can operate independently from the AI system.

In a further embodiment, a method includes, in a processing device having connectivity to i) an Artificial Intelligence (AI) system configured to obtain data from a network having a plurality of network elements and to determine actions for network control through one or more Machine Learning (ML) algorithms and ii) a controller configured to cause the actions in the network, obtaining the actions from the AI system via the network interface; analyzing the actions; and one of allowing, blocking, and modifying the actions from the AI system to the controller. The method can further include obtaining a view of the network independent from the AI system; and developing deterministic decisions which are used to compare with the actions from the ML algorithms. The method can further include allowing the actions if the actions are within the deterministic decisions; blocking the actions if the actions are not within the deterministic decisions; and modifying the actions based on overlap with the deterministic decisions. The method can further include obtaining operator input before the one of allow, block, and modify the actions; and providing the operator input to the ML algorithms for feedback therein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause a processor to perform the steps of:
  obtaining telemetry data associated with a network having a plurality of network elements;
  presenting a list of ongoing issues and predicted issues based on the telemetry data, on a display;

responsive to a selection of an issue that is one of the ongoing issues and the predicted issues in the list, presenting a root cause analysis of the issue including multiple diagnoses associated with multiple, respective root causes of the issue, each of the multiple diagnoses indicating the associated root cause and including an associated predictability factor, displayed with the root cause analysis, indicating a degree of confidence that the associated root cause is an actual root cause of the issue, the predictability factor included in each of the diagnoses collectively forming a plurality of predictability factors;

presenting a list of prescriptive actions on the display to address the issue based on the root cause analysis, the list of prescriptive actions including a mechanism for a user that causes execution of any of the prescriptive actions;

receiving a selection of one or more of the prescriptive actions from the user; and responsive to the selection and implementation of the one or more of the prescriptive actions and an impact based on the implementation of the one or more of the prescriptive actions, updating a particular predictability factor of the plurality of predictability factors, the particular predictability factor indicating how reliable the associated diagnosis is, and storing the updated predictability factor for future diagnosis.

2. The non-transitory computer-readable medium of claim 1, the instructions further comprising managing a plurality of issue files each for a predetermined issue, wherein the root cause analysis, the particular predictability factor, and the list of prescriptive actions for the selected issue is in a corresponding issue file.

3. The non-transitory computer-readable medium of claim 2, the instructions further comprising responsive to feedback, including the selection of the one or more of the prescriptive actions from the user, updating multiple diagnoses in the corresponding issue file.

4. The non-transitory computer-readable medium of claim 2, wherein the root cause analysis identifies multiple diagnoses each having a different list of prescriptive actions.

5. The non-transitory computer-readable medium of claim 2, the instructions further comprising prior to the obtaining, creating the plurality of issue files utilizing historical data and associated patterns and trends therein.

6. The non-transitory computer-readable medium of claim 2, wherein the particular predictability factor is below a threshold, the instructions further comprising:

quarantining the issue for review; and responsive to manual review of the issue, updating the corresponding issue files based on the manual review, to improve the particular predictability factor.

7. The non-transitory computer-readable medium of claim 1, wherein the selected issue is a predicted issue, the instructions further comprising creating a new ticket in a ticketing system for the predicted issue.

8. The non-transitory computer-readable medium of claim 1, wherein the root cause analysis and the prescriptive actions are based on machine learning techniques.

9. An apparatus comprising:

a network interface;

a processor communicatively coupled to the network interface; and memory storing instructions that, when executed, cause the processor to obtain telemetry data associated with a network having a plurality of network elements, present a list of ongoing issues and predicted issues based on the telemetry data, for a display, responsive to a selection of an issue that is one of the ongoing issues and the predicted issues in the list, present a root cause analysis of the issue including multiple diagnoses associated with multiple, respective root causes of the issue, each of the multiple diagnoses indicating the associated root cause and including an associated predictability factor, displayed with the root cause analysis, indicating a degree of confidence that the associated root cause is an actual root cause of the issue, the predictability factor included in each of the diagnoses collectively forming a plurality of predictability factors;

present a list of prescriptive actions on the display to address the issue based on the root cause analysis, the list of prescriptive actions including a mechanism for a user that causes execution of any of the prescriptive actions;

receive a selection of one or more of the prescriptive actions from the user; and responsive to the selection and implementation of the one or more of the prescriptive actions and an impact based on the implementation of the one or more of the prescriptive actions, update a particular predictability factor of the plurality of predictability factors, the particular predictability factor indicating how reliable the associated diagnosis is, and storing the updated predictability factor for future diagnosis.

10. The apparatus of claim 9, wherein the memory storing instructions that, when executed, further cause the processor to manage a plurality of issue files each for a predetermined issue, wherein the root cause analysis, the particular predictability factor, and the list of prescriptive actions for the selected issue is in a corresponding issue file.

11. The apparatus of claim 10, wherein the memory storing instructions that, when executed, further cause the processor to responsive to feedback, including the selection of the one or more of the prescriptive actions from the user, update the multiple diagnoses in the corresponding issue file.

12. The apparatus of claim 10, wherein the root cause analysis identifies multiple diagnoses each having a different list of prescriptive actions.

13. The apparatus of claim 10, wherein the memory storing instructions that, when executed, further cause the processor to prior to the telemetry data being obtained, create the plurality of issue files utilizing historical data and associated patterns and trends therein.

14. The apparatus of claim 10, wherein the particular predictability factor is below a threshold, and wherein the memory storing instructions that, when executed, further cause the processor to quarantine the issue for review, and responsive to manual review of the issue, update the corresponding issue files based on the manual review, to improve the particular predictability factor.

15. The apparatus of claim 10, wherein the selected issue is a predicted issue, and wherein the memory storing instructions that, when executed, further cause the processor to create a new ticket in a ticketing system for the predicted issue.

16. The apparatus of claim 10, wherein the root cause analysis and the prescriptive actions are based on machine learning techniques.

17. A method comprising:
obtaining telemetry data associated with a network having a plurality of network elements;
presenting a list of ongoing issues and predicted issues based on the telemetry data, on a display;
responsive to a selection of an issue that is one of the ongoing issues and the predicted issues in the list, presenting a root cause analysis of the issue including multiple diagnoses associated with multiple, respective root causes of the issue, each of the multiple diagnoses indicating the associated root cause and including an associated predictability factor, displayed with the root cause analysis, indicating a degree of confidence that the associated root cause is an actual root cause of the issue, the predictability factor included in each of the diagnoses collectively forming a plurality of predictability factors;
presenting a list of prescriptive actions on the display to address the issue based on the root cause analysis, the list of prescriptive actions including a mechanism for a user that causes execution of any of the prescriptive actions;
receiving a selection of one or more of the prescriptive actions from the user; and
responsive to the selection and implementation of the one or more of the prescriptive actions and an impact based on the implementation of the one or more of the prescriptive actions, updating a particular predictability factor of the plurality of predictability factors, the particular predictability factor indicating how reliable the associated diagnosis is, and storing the updated predictability factor for future diagnosis.

* * * * *